(12) United States Patent
Yamaoka et al.

(10) Patent No.: US 9,193,824 B2
(45) Date of Patent: Nov. 24, 2015

(54) RESIN COMPOSITION AND MOLDED BODY OF SAME

(71) Applicant: MITSUBISHI CHEMICAL CORPORATION, Chiyoda-ku (JP)

(72) Inventors: Katsushi Yamaoka, Mie (JP); Toru Takashima, Mie (JP)

(73) Assignee: MITSUBISHI CHEMICAL CORPORATION, Chiyoda-ku (JP)

( * ) Notice: Subject to any disclaimer, the term of this patent is extended or adjusted under 35 U.S.C. 154(b) by 0 days.

(21) Appl. No.: 14/464,114

(22) Filed: Aug. 20, 2014

(65) Prior Publication Data
US 2014/0357748 A1 Dec. 4, 2014

Related U.S. Application Data

(63) Continuation of application No. PCT/JP2013/054047, filed on Feb. 19, 2013.

(30) Foreign Application Priority Data

Feb. 20, 2012 (JP) ................. 2012-034324

(51) Int. Cl.
| | | |
|---|---|---|
| C08G 63/02 | (2006.01) |
| C08G 64/06 | (2006.01) |
| C08J 9/12 | (2006.01) |
| C08J 9/00 | (2006.01) |
| C08L 69/00 | (2006.01) |
| B29C 44/58 | (2006.01) |
| C08G 64/02 | (2006.01) |
| B29K 69/00 | (2006.01) |

(52) U.S. Cl.
CPC .............. *C08G 64/06* (2013.01); *B29C 44/586* (2013.01); *C08G 64/0208* (2013.01); *C08J 9/0061* (2013.01); *C08J 9/122* (2013.01); *C08L 69/00* (2013.01); *B29K 2069/00* (2013.01); *B29K 2995/0063* (2013.01); *C08J 2369/00* (2013.01); *C08J 2467/03* (2013.01); *C08L 2201/08* (2013.01)

(58) Field of Classification Search
CPC ....... C08G 63/78; C08G 67/04; C08G 63/785
USPC ................... 528/271, 272, 196, 198; 524/445
See application file for complete search history.

(56) References Cited

U.S. PATENT DOCUMENTS

| | | | |
|---|---|---|---|
| 6,608,167 B1 * | 8/2003 | Hayes et al. ................. 528/271 |
| 2009/0105393 A1 | 4/2009 | Jansen et al. | |
| 2014/0179818 A1 | 6/2014 | Takashima et al. | |

FOREIGN PATENT DOCUMENTS

| | | | |
|---|---|---|---|
| EP | 2 371 877 A1 | 10/2011 |
| EP | 2 752 444 A1 | 7/2014 |
| GB | 1079686 A | 8/1967 |
| JP | 2002-192549 A | 7/2002 |
| JP | 2009-000964 A | 1/2009 |
| JP | 2009-074031 A | 4/2009 |
| JP | 2011-500925 A | 1/2011 |
| JP | 2011-070019 A | 4/2011 |
| JP | 2012-236956 A | 12/2012 |
| WO | WO 2013/031924 A1 | 3/2013 |

OTHER PUBLICATIONS

International Search Report issued May 21, 2013 in PCT/JP2013/054047 (with English language translation).
Partial European Search Report issued Apr. 2, 2015 in Patent Application No. 13752336.1.
Extended European Search Report issued Aug. 3, 2015, in European Patent Application No. 13752336.1.

\* cited by examiner

*Primary Examiner* — Terressa Boykin
(74) *Attorney, Agent, or Firm* — Oblon, McClelland, Maier & Neustadt, L.L.P.

(57) ABSTRACT

An object of the present invention is to provide a polycarbonate resin composition comprising a polycarbonate resin containing, as a raw material, isosorbide that is easy to produce and excellent in such as mechanical properties, etc., and a molded body, particularly a foam-molded body, composed of the resin composition. The present invention provides a foam-molded body of a resin composition containing a polycarbonate resin having at least a structural unit derived from a dihydroxy compound represented by the following formula (1):

[Chem. 1]

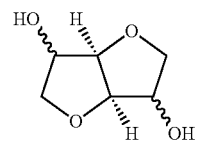

(1)

wherein the strain-hardening factor of uniaxial extensional viscosity of said resin composition is from 0.1 to 5.

11 Claims, No Drawings

RESIN COMPOSITION AND MOLDED BODY OF SAME

CROSS-REFERENCE TO RELATED APPLICATIONS

This application is a Continuation of PCT/JP2013/054047 filed on Feb. 19, 2013. This application is based upon and claims the benefit of priority to Japanese Application No. 2012-034324 filed on Feb. 20, 2012, the entire contents of which are incorporated herein by reference.

TECHNICAL FIELD

The present invention relates to a polycarbonate resin composition and a molded body comprising the resin composition.

BACKGROUND ART

A polycarbonate resin is generally produced using a raw material derived from petroleum resources, but in recent years, depletion of petroleum resources is feared, and it is required to provide a polycarbonate resin using a raw material obtained from biomass resources such as plant. In addition, since global warming due to increase or accumulation of carbon dioxide emissions brings about climate change or the like, there is a demand to develop a polycarbonate resin using, as a raw material, a plant-derived monomer that is carbon neutral even when discarded after use.

Under these circumstances, for example, a technique of using isosorbide as a plant-derived monomer and obtaining a polycarbonate through transesterification with diphenyl carbonate has been proposed (see, for example, Patent Document 1). Also, a polycarbonate resin containing isosorbide as a raw material exhibits excellent mechanical properties and heat resistance and therefore, its use for industrial material applications such as automotive component has been proposed (see, for example, Patent Document 2).

On the other hand, a molded body obtained by foaming a polymer (foam-molded body) is a lightweight structure excellent in heat insulating property or shock absorption and is used as a variety of materials by making use of its properties. Here, as disclosed in Comparative Example of Patent Document 3 using a polycarbonate resin having dissolved therein carbon dioxide, good foaming performance is not necessarily achieved by conventional polycarbonate resins.

BACKGROUND ART DOCUMENT

Patent Document

Patent Document 1: GB Patent No. 1,079,686
Patent Document 2: JP-A-2009-74031 (the term "JP-A" as used herein means an "unexamined published Japanese patent application")
Patent Document 3: JP-A-2002-192549

SUMMARY OF INVENTION

Problem that Invention is to Solve

Under these circumstances, an object of the present invention is to provide a polycarbonate resin composition comprising a polycarbonate resin containing, as a raw material, isosorbide that is easy to produce and excellent in such as mechanical properties, and a molded body, particularly a foam-molded body, composed of the resin composition.

Means for Solving Problem

As a result of many intensive studies to attain the above-described object, the present inventors have found that a polycarbonate resin composition which is a resin composition containing a polycarbonate resin having at least a structural unit derived from isosorbide and in which the strain-hardening factor of uniaxial extensional viscosity of the resin composition is in a specific range, as well as a molded body composed of the resin composition have excellent heat resistance and mechanical properties, in particular, the resin composition exhibits an excellent foaming performance in the foam-molding and can be formed into a lightweight, high-strength molded body having a good outer appearance and a small bubble diameter. The present invention has been accomplished based on this finding.

That is, the gist of the present invention is as follows.

[1] A foam-molded body of a resin composition containing a polycarbonate resin having at least a structural unit derived from a dihydroxy compound represented by the following formula (1):

[Chem. 1]

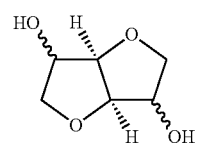

(1)

wherein the average diameter of bubbles in said foam-molded body is 100 μm or less.

[2] A foam-molded body of a resin composition containing a polycarbonate resin having at least a structural unit derived from a dihydroxy compound represented by the following formula (1):

[Chem. 2]

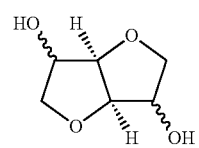

(1)

wherein the strain-hardening factor of uniaxial extensional viscosity of said resin composition is from 0.1 to 5.

[3] A foam-molded body of a resin composition containing a polycarbonate resin having at least a structural unit derived from a dihydroxy compound represented by the following formula (1):

[Chem. 3]

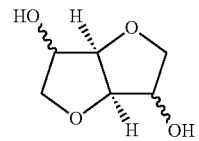

(1)

wherein the structural unit derived from a compound containing three or more hydroxy groups in the molecule is contained in a ratio of 0.2 to 2 mol % based on structural units derived from all dihydroxy compounds constituting said polycarbonate resin.

[4] A foam-molded body of a resin composition containing a polycarbonate resin having at least a structural unit derived from a dihydroxy compound represented by the following formula (1):

[Chem. 4]

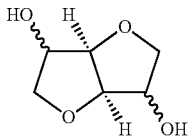
(1)

wherein said resin composition contains a compound having two or more per molecule of at least one functional group selected from the group consisting of carbodiimide, isocyanate, epoxy, silane, an acid anhydride and oxazoline.

[5] The foam-molded body as described in any one of the above [1] to [4], wherein said polycarbonate resin is a copolymer of a structural unit derived from a dihydroxy compound represented by formula (1) and a structural unit derived from another dihydroxy compound.

[6] The foam-molded body as described in the above [5], wherein said structural unit derived from another dihydroxy compound is any one structural unit selected from the group consisting of:

Formula (2):

$$HO-R^1-OH \qquad (2)$$

(wherein $R^1$ represents a substituted or unsubstituted cycloalkylene group having a carbon number of 4 to 20), Formula (3):

$$HO-CH_2-R^2-CH_2-OH \qquad (3)$$

(wherein $R^2$ represents a substituted or unsubstituted cycloalkylene group having a carbon number of 4 to 20), Formula (4):

$$H-(O-R^3)_p-OH \qquad (4)$$

(wherein $R^3$ represents a substituted or unsubstituted alkylene group having a carbon number of 2 to 10, and p is an integer of 2 to 100), and Formula (5):

$$HO-R^4-OH \qquad (5)$$

(wherein $R^4$ represents a substituted or unsubstituted alkylene group having a carbon number of 2 to 20 or a group having a substituted or unsubstituted acetal ring).

[7] The foam-molded body as described in the above [5] or [6], wherein said structural unit derived from another dihydroxy compound is a structural unit derived from any one member selected from the group consisting of cyclohexanedimethanols, tricyclodecanedimethanols and hexanediols.

[8] The foam-molded body as described in any one of the above [1] to [7], wherein said resin composition further contains a thermoplastic resin.

[9] A polycarbonate resin composition that is a resin composition containing a polycarbonate resin having at least a structural unit derived from a dihydroxy compound represented by the following formula (1):

[Chem. 5]

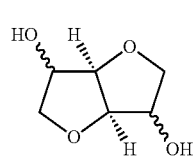
(1)

wherein the strain-hardening factor of uniaxial extensional viscosity of said resin composition is from 0.1 to 5.

[10] The polycarbonate resin composition as described in the above [9, wherein said polycarbonate resin is a copolymer of a structural unit derived from a dihydroxy compound represented by formula (1) and a structural unit derived from another dihydroxy compound.

[11] The polycarbonate resin composition as described in the above [10], wherein said structural unit derived from another dihydroxy compound is any one structural unit selected from the group consisting of:

Formula (2):

$$HO-R^1-OH \qquad (2)$$

(wherein $R^1$ represents a substituted or unsubstituted cycloalkylene group having a carbon number of 4 to 20), Formula (3):

$$HO-CH_2-R^2-CH_2-OH \qquad (3)$$

(wherein $R^2$ represents a substituted or unsubstituted cycloalkylene group having a carbon number of 4 to 20), Formula (4):

$$H-(O-R^3)_p-OH \qquad (4)$$

(wherein $R^3$ represents a substituted or unsubstituted alkylene group having a carbon number of 2 to 10, and p is an integer of 2 to 50), and Formula (5):

$$HO-R^4-OH \qquad (5)$$

(wherein $R^4$ represents a substituted or unsubstituted alkylene group having a carbon number of 2 to 20 or a group having a substituted or unsubstituted acetal ring).

[12] The polycarbonate resin composition as described in the above [10] or [11], wherein said structural unit derived from another dihydroxy compound is a structural unit derived from any one member selected from the group consisting of cyclohexanedimethanols, tricyclodecanedimethanols and hexanediols.

[13] The polycarbonate resin composition as described in any one of the above [9] to [12], further containing a thermoplastic resin.

[14] A molded body formed from the polycarbonate resin composition claimed in any one of the above [9] to [13].

The foam-molded body provided by the present invention has excellent heat resistance, mechanical properties and the like. In addition, thanks to microbubbles with a small foamed cell diameter, the foam-molded body exhibits a high light reflection efficiency and is useful also as a reflector. The resin composition provided by the present invention exhibits excellent foaming performance in the foam-molding and can be formed into a lightweight, high-strength foam-molded body having a good outer appearance and a small bubble diameter.

MODE FOR CARRYING OUT INVENTION

The present invention is described in detail below. Incidentally, the present invention is not limited to the below-described embodiments and can be carried out by making various modifications therein within the scope of its gist.

First, the polycarbonate resin for use in the present invention is described, and next, the resin composition, the molding method, the usage of molded body, and the like are described.

[1] Polycarbonate Resin

The polycarbonate resin for use in the present invention has at least a structural unit derived from a dihydroxy compound represented by the following formula (1):

[Chem. 6]

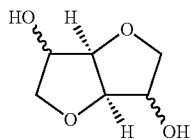

(1)

and, if desired, has a structural unit derived from another dihydroxy compound, and the polycarbonate resin can be produced using these dihydroxy compounds as the raw material.

<Dihydroxy Compound Represented by Formula (1)>

The dihydroxy compound represented by formula (1) (hereinafter, sometimes simply referred to as "compound of formula (1)") includes, for example, isosorbide, isomannide and isoidide, which are in a stereoisomeric relationship. These compounds are obtained from D-glucose, D-mannose and L-idose, respectively. For example, isosorbide can be obtained by hydrogenating D-glucose and then performing dehydration using an acid catalyst.

One of these compounds may be used alone, or two or more thereof may be used in combination. Among these dihydroxy compounds, isosorbide obtained by dehydration condensation of sorbitol produced from various starches existing abundantly as a resource and being easily available is most preferred in view of availability, ease of production, optical properties and moldability.

<Another Dihydroxy Compound>

Another dihydroxy compound is not particularly limited as long as a polycarbonate copolymer can be formed together with the compound of formula (1) by a generally employed polymerization method, but, for example, any one compound selected from the group consisting of dihydroxy compounds represented by the following formulae (2) to (5) is preferred. Incidentally, in the following, the carbon number of various groups means, when the group has a substituent, the total carbon number including the carbon number of the substituent.

$$HO\text{—}R^1\text{—}OH \qquad (2)$$

(In formula (2), $R^1$ represents a substituted or unsubstituted cycloalkylene group having a carbon number of 4 to 20).

$$HO\text{—}CH_2\text{—}R^2\text{—}CH_2\text{—}OH \qquad (3)$$

(In formula (3), $R^2$ represents a substituted or unsubstituted cycloalkylene group having a carbon number of 4 to 20).

$$H\text{—}(O\text{—}R^3)_p\text{—}OH \qquad (4)$$

(In formula (4), $R^3$ represents a substituted or unsubstituted alkylene group having a carbon number of 2 to 10, and p is an integer of 2 to 100).

$$HO\text{—}R^4\text{—}OH \qquad (5)$$

(In formula (5), $R^4$ represents a substituted or unsubstituted alkylene group having a carbon number of 2 to 20 or a group having a substituted or unsubstituted acetal ring).

The dihydroxy compounds represented by formulae (2) to (5) are described in more detail below.

<Dihydroxy Compound Represented by Formula (2)>

The dihydroxy compound represented by formula (2) (hereinafter, sometimes simply referred to as "compound of formula (2)") is an alicyclic dihydroxy compound having on $R^1$ a substituted or unsubstituted cycloalkylene group with a carbon number of 4 to 20, preferably a carbon number of 4 to 18. Here, in the case where $R^1$ has a substituent, the substituent includes a substituted or unsubstituted alkyl group having a carbon number of 1 to 12, and in the case where this alkyl group has a substituent, examples of the substituent include an alkoxy group such as methoxy group, ethoxy group and propoxy group, and an aryl group such as phenyl group and naphthyl group.

This dihydroxy compound has a ring structure, whereby the toughness of a molded article when the obtained polycarbonate copolymer is molded can be enhanced.

The cycloalkylene group of $R^1$ is not particularly limited as long as it is a hydrocarbon group having a ring structure, and the structure may be a bridged structure having a bridgehead carbon atom. From the standpoint that production of a dihydroxy compound is easy and the amount of impurities can be reduced, the dihydroxy compound represented by formula (2) is preferably a compound containing a 5-membered ring structure or a 6-membered ring structure, that is, a dihydroxy compound where $R^1$ is a substituted or unsubstituted cyclopentylene group or a substituted or unsubstituted cyclohexylene group. Such a dihydroxy compound contains a 5-membered ring structure or a 6-membered ring structure, so that the heat resistance of the obtained polycarbonate copolymer can be increased. The 6-membered ring structure may be fixed in a chair or boat form by covalent bonding.

Above all, in the compound of formula (2), $R^1$ is preferably a variety of isomers represented by the following formula (7). Here, in formula (7), $R^{11}$ represents a hydrogen atom or a substituted or unsubstituted alkyl group having a carbon number of 1 to 12. When $R^{11}$ is an alkyl group having a carbon number of 1 to 12 and having a substituent, examples of the substituent include an alkoxy group such as methoxy group, ethoxy group and propoxy group, and an aryl group such as phenyl group and naphthyl group.

[Chem. 7]

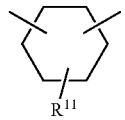

(7)

More specifically, the compound of formula (2) includes, but is not limited to, for example, tetramethylcyclobutanediol, 1,2-cyclopentanediol, 1,3-cyclopentanediol, 1,2-cyclohexanediol, 1,3-cyclohexanediol, 1,4-cyclohexanediol, 2-methyl-1,4-cyclohexanediol, tricyclodecanediols, and pentacyclodiols.

According to the performance required of the obtained polycarbonate resin, one of these compounds may be used alone, or two or more thereof may be used in combination.

<Dihydroxy Compound Represented by Formula (3)>

The dihydroxy compound represented by formula (3) (hereinafter, sometimes simply referred to as "compound of formula (3)") is an alicyclic dihydroxy compound having on $R^2$ a substituted or unsubstituted cycloalkylene group with a carbon number of 4 to 20, preferably a carbon number of 3 to 18. Here, in the case where $R^2$ has a substituent, the substituent includes a substituted or unsubstituted alkyl group having a carbon number of 1 to 12, and in the case where this alkyl group has a substituent, examples of the substituent include an alkoxy group such as methoxy group, ethoxy group and propoxy group, and an aryl group such as phenyl group and naphthyl group.

This dihydroxy compound has a ring structure, whereby the toughness of a molded article when the obtained polycarbonate copolymer is molded can be enhanced.

The cycloalkylene group of $R^2$ is not particularly limited as long as it is a hydrocarbon group having a ring structure, and the structure may be a bridged structure having a bridgehead carbon atom. From the standpoint that production of a dihydroxy compound is easy and the amount of impurities can be reduced, the dihydroxy compound represented by formula (3) is preferably a compound containing a 5-membered ring structure or a 6-membered ring structure, that is, a dihydroxy compound where $R^2$ is a substituted or unsubstituted cyclopentylene group or a substituted or unsubstituted cyclohexylene group. Such a dihydroxy compound contains a 5-membered ring structure or a 6-membered ring structure, so that the heat resistance of the obtained polycarbonate resin can be increased. The 6-membered ring structure may be fixed in a chair or boat form by covalent bonding. Above all, in the dihydroxy compound of formula (3), $R^2$ is preferably a variety of isomers represented by formula (7).

More specifically, the compound of formula (3) includes, but is not limited to, for example, cyclopentanedimethanols such as 1,3-cyclopentanedimethanol, cyclohexanedimethanols such as 1,2-cyclohexanedimethanol, 1,3-cyclohexanedimethanol and 1,4-cyclohexanedimethanol, and tricyclodecanedimethanols such as 3,8-bis(hydroxymethyl)tricyclo[5.2.1.0$^{2.6}$]decane, 3,9-bis(hydroxymethyl)tricyclo[5.2.1.0$^{2.6}$]decane, 4,8-bis(hydroxymethyl)tricyclo[5.2.1.0$^{2.6}$]decane and 4,9-bis(hydroxymethyl)tricyclo[5.2.1.0$^{2.6}$]decane.

According to the performance required of the obtained polycarbonate resin, one of these compounds may be used alone, or two or more thereof may be used in combination.

That is, these compounds are sometimes obtained as a mixture of isomers for a production-related reason and in this case, the isomer mixture can be used as it is. For example, a mixture of 3,8-bis(hydroxymethyl)tricyclo[5.2.1.0$^{2.6}$]decane, 3,9-bis(hydroxymethyl)tricyclo[5.2.1.0$^{2.6}$]decane, 4,8-bis(hydroxymethyl)tricyclo[5.2.1.0$^{2.6}$]decane and 4,9-bis(hydroxymethyl)tricyclo[5.2.1.0$^{2.6}$]decane can be used.

Among specific examples of the compound of formula (3), cyclohexanedimethanols are preferred, and in view of availability and ease of handling, 1,4-cyclohexanedimethanol, 1,3-cyclohexanedimethanol and 1,2-cyclohexanedimethanol are preferred.

<Dihydroxy Compound Represented by Formula (4)>

The dihydroxy compound represented by formula (4) (hereinafter, sometimes simply referred to as "compound of formula (4)") is a compound having on $R^3$ a substituted or unsubstituted alkylene group with a carbon number of 2 to 10, preferably a carbon number of 2 to 5. p is an integer of 2 to 100, preferably an integer of 4 to 50, more preferably an integer of 6 to 30, still more preferably an integer of 12 to 15.

Specifically, the compound of formula (4) includes, but is not limited to, for example, diethylene glycol, triethylene glycol, and a polyethylene glycol (having a molecular weight of 150 to 4,000). The compound of formula (4) is preferably a polyethylene glycol having a molecular weight of 300 to 2,000, more preferably a polyethylene glycol having a molecular number of 600 to 1,500.

According to the performance required of the obtained polycarbonate copolymer, one of these compounds may be used alone, or two or more thereof may be used in combination.

<Dihydroxy Compound Represented by Formula (5)>

The dihydroxy compound represented by formula (5) (hereinafter, sometimes simply referred to as "compound of formula (5)") is a dihydroxy compound having on $R^4$ a substituted or unsubstituted alkylene group with a carbon number of 2 to 20, preferably a carbon number of 2 to 10, or a group having a substituted or unsubstituted acetal ring. In the case where the alkylene group of $R^4$ has a substituent, the substituent includes an alkyl group having a carbon number of 1 to 5. Also, when the group having an acetal ring of $R^4$ has a substituent, the substituent includes an alkyl group having a carbon number of 1 to 3.

Out of the compounds of formula (5), the dihydroxy compound where $R^4$ is a substituted or unsubstituted alkylene group having a carbon number of 2 to 20 includes, but is not limited to, for example, propanediols such as 1,3-propanediol and 1,2-propanediol, butanediols such as 1,4-butanediol and 1,3-butanediol, heptanediols such as 1,5-heptanediol, and hexanediols such as 1,6-hexanediol. Among these, hexanediols are preferred.

On the other hand, the dihydroxy compound where $R^4$ is a group having a substituted or unsubstituted acetal ring is not particularly limited but, among others, is preferably a dihydroxy compound having a spiro structure represented by the following formula (8) or (9), more preferably a dihydroxy compound having a plurality of ring structures represented by the following formula (8).

[Chem. 8]

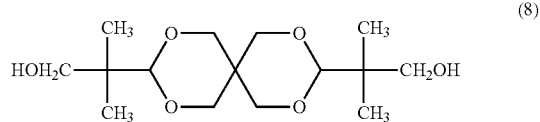

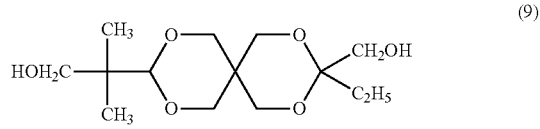

Among these dihydroxy compounds, in view of availability, ease of handling, high reactivity during polymerization, and hue of the obtained polycarbonate copolymer, 1,3-propanediol and 1,6-hexanediol are preferred. Also, in view of heat resistance, dihydroxy compounds containing a group having an acetal ring are preferred, and a compound having a plurality of ring structures typified by formula (8) is more preferred.

According to the performance required of the obtained polycarbonate copolymer, one of these compounds may be used alone, or two or more thereof may be used in combination.

<Dihydroxy Compound Other than Compounds Represented by Formulae (1) to (5)>

The polycarbonate copolymer for use in the present invention may contain a structural unit derived from a dihydroxy compound other than the compounds of formulae (1) to (5), in addition to the structural units derived from these compounds.

The dihydroxy compound other than the compounds of formulae (1) to (5) includes, for example, bisphenols.

The bisphenols include, for example, 2,2-bis(4-hydroxyphenyl)propane (=bisphenol A), 2,2-bis(4-hydroxy-3,5-dimethylphenyl)propane, 2,2-bis(4-hydroxy-3,5-diethylphenyl)propane, 2,2-bis(4-hydroxy-(3,5-diphenyl)phenyl)propane, 2,2-bis(4-hydroxy-3,5-dibromophenyl)propane, 2,2-bis(4-hydroxyphenyl)pentane, 2,4'-dihydroxy-diphenylmethane, bis(4-hydroxyphenyl)methane, bis(4-hydroxy-5-nitrophenyl)methane, 1,1-bis(4-hydroxyphenyl)ethane, 3,3-bis(4-hydroxyphenyl)pentane, 1,1-bis(4-hydroxyphenyl)cyclohexane, bis(4-hydroxyphenyl)sulfone, 2,4'-dihydroxydiphenylsulfone, bis(4-hydroxyphenyl)sulfide, 4,4'-dihydroxydiphenyl ether, 4,4'-dihydroxy-3,3'-dichlorodiphenyl ether, and 4,4'-dihydroxy-2,5-diethoxydiphenyl ether.

According to the performance required of the obtained polycarbonate resin, one of these compounds may be used alone, or two or more thereof may be used in combination.

The structural unit derived from other dihydroxy compounds in the polycarbonate resin for use in the present invention is preferably any one structural unit selected from the group consisting of a structural unit derived from cyclohexanedimethanols, a structural unit derived from tricyclodecanedimethanols, and a structural unit derived from hexanediols.

<Ratio of Dihydroxy Compound-Derived Structural Units Contained>

The ratio of the structural unit derived from a dihydroxy compound represented by formula (1) to the structural units derived from all dihydroxy compounds constituting the polycarbonate resin is not particularly limited but is usually 30 mol % or more, preferably 40 mol % or more, more preferably 50 mol % or more, and is usually 99 mol % or less, preferably 95 mol % or less, more preferably 90 mol % or less.

If the ratio of the structural unit derived from a dihydroxy compound represented by formula (1) to the structural units derived from all dihydroxy compounds constituting the polycarbonate resin is less than this range, the degree of plant derivation may decrease and furthermore, the glass transition temperature may drop, failing in obtaining the required heat resistance. Also, if the ratio of the structural unit derived from a dihydroxy compound represented by formula (1) to the structural units derived from all dihydroxy compounds constituting the polycarbonate copolymer exceeds the range above, the impact resistance may be reduced and furthermore, the gas solubility may be low, failing in obtaining a sufficient lightweight effect when the resin is foam-molded.

Incidentally, in the present invention, the later-described compound having three or more hydroxy groups in the molecule is not encompassed by the above-described dihydroxy compounds.

<Physicochemical Properties of Polycarbonate Resin>

The physicochemical properties of the polycarbonate resin for use in the present invention are not particularly limited, but it is preferable to obtain a molded body by foaming a polycarbonate resin having the following properties.

First, as for the polymerization degree of the polycarbonate resin, in terms of reduced viscosity measured at a temperature of 30.0° C.±0.1° C. by using, as a solvent, a mixed solution of phenol and 1,1,2,2-tetrachloroethane in a mass ratio of 1:1 and accurately adjusting the polycarbonate concentration to 1.00 g/dl, the polymerization degree is preferably 0.40 dl/g or more, more preferably 0.50 dl/g or more, and is usually 2.00 dl/g or less, preferably 1.60 dl/g or less. If the reduced viscosity is extremely low, the mechanical strength when foam-molded is likely to become weak, whereas if the reduced viscosity is too high, flowability during molding tends to readily decrease.

The glass transition temperature (Tg) is usually 165° C. or less, preferably 155° C. or less, more preferably less than 145° C., still more preferably 130° C. or less, and usually 40° C. or more, preferably 50° C. or more, more preferably 60° C. or more, still more preferably 70° C. or more.

If the glass transition temperature is too high, foam-molding tends to require a high temperature, and the gas solubility in the polymer may be low, failing in obtaining a high expansion ratio when the resin is foam-molded. Furthermore, if the glass transition temperature is too low, the heat resistance of the foam-molded body may be deteriorated.

Also, the polycarbonate resin gives a single glass transition temperature when differential scanning calorimeter (DSC) measurement is performed, but by adjusting the kind or blending ratio of the dihydroxy compound represented by formula (1) and other dihydroxy compounds at the production, the resin can be obtained as a polymer having an arbitrary glass transition temperature.

The 5% thermal weight loss temperature is preferably 340° C. or more, more preferably 345° C. or more. As the 5% thermal weight loss temperature is higher, the thermal stability becomes higher and the resin can withstand use at a higher temperature. Also, the production temperature can be set high and the latitude for control during production can be broadened, facilitating the production. As the thermal weight loss temperature is lower, the thermal stability decreases and use at a high temperature becomes difficult. In addition, the latitude for control during production is narrowed, making it difficult to produce the polymer. Accordingly, the upper limit of the 5% thermal weight loss temperature is not limited, and higher is better. The decomposition temperature of the copolymer serves as the upper limit.

The Izod impact strength is preferably 30 J/m$^2$ or more. As the Izod impact strength is larger, the molded body comes to have higher strength and is less likely to be broken and therefore, the upper limit is not particularly limited.

In the polycarbonate resin for use in the present invention, the amount of gas evolution other than a phenol component per unit area at 110° C. (hereinafter, sometimes simply referred to as "amount of gas evolution") is preferably 5 ng/cm$^2$ or less, and it is more preferred that the amount of gas evolution derived from a dihydroxy compound other than the dihydroxy compound represented by formula (1) is 0.5 ng/cm$^2$ or less. As this amount of gas evolution is smaller, the resin is more successfully applied to usage disliking the effect of gas evolution, for example, a purpose of storing an electronic component such as semiconductor, a use as an interior material of a building, and a housing case for home electric appliances and the like.

Incidentally, specific methods for measuring the 5% thermal weight loss temperature, Izod impact strength and amount of gas evolution of the polycarbonate resin are described in Examples later.

The polycarbonate resin for use in the present invention can be produced by a polymerization method used in general, and the polymerization method may be any method of a solution polymerization method using phosgene, a melt polymerization method using a reaction with a carbonic acid diester, and the like. More specifically, a melt polymerization method of, for example, reacting a dihydroxy compound containing at least a dihydroxy compound represented by formula (1) with a carbonic acid diester in the presence of a polymerization catalyst is preferred.

This melt polymerization method itself is a known method, and details thereof are described, for example, in JP-A-2008-24919, JP-A-2009-161746, JP-A-2009-161745, International Publication No. 2011/06505, and JP-A-2011-111614. The polycarbonate resin for use in the present invention can be produced in accordance with the method described in these publications.

[2] Resin Composition

The polycarbonate resin composition of the present invention is prepared as a resin composition having blended therein, if desired, another thermoplastic resin, various additives such as heat stabilizer, antioxidant, ultraviolet absorber, light stabilizer and bluing agent, a branching agent, a foam adjusting agent and the like and is subjected to various moldings together with an additive according to the molding method, for example, in the case of foam-molding, together with a foaming agent, by using known molding methods.

<Thermoplastic Resin>

In the present invention, if desired, a predetermined amount of a thermoplastic resin can be blended with the above-described polycarbonate resin. Incidentally, the "thermoplastic resin" as used in the present invention differs from the polycarbonate resin having at least a structural unit derived from a dihydroxy compound represented by formula (1).

The blending amounts of the polycarbonate resin and the thermoplastic resin are from 1 to 100 parts by mass of the polycarbonate resin and from 99 to 0 part by mass of the thermoplastic resin; preferably, from 10 to 100 parts by mass of the polycarbonate resin and from 90 to 0 part by mass of the thermoplastic resin; more preferably, from 30 to 100 parts by mass of the polycarbonate resin and from 70 to 0 part by mass of the thermoplastic resin; and still more preferably, from 50 to 100 parts by mass of the polycarbonate resin and from 50 to 0 part by mass of the thermoplastic resin. If the blending amount of the thermoplastic resin is too large, the degree of plant derivation decreases.

Here, the thermoplastic resin includes, for example, an aromatic polyester-based resin such as polyethylene terephthalate, polypropylene terephthalate, polybutylene terephthalate and polycyclohexanedimethanol terephthalate; a saturated polyester-based resin including an aliphatic polyester-based resin, etc. such as polylactic acid, polybutylene succinate and polycyclohexanedimethanol cyclohexane dicarboxylate; an aromatic polycarbonate-based resin composed of various bisphenols such as bisphenol A and bisphenol Z; an alicyclic polycarbonate-based resin composed of an alicyclic diol such as 3(4),8(9)-bis(hydroxymethyl)tricyclo[5.2.1.0$^{2.6}$]decane; a polycarbonate-based resin including an aliphatic polycarbonate-based resin, etc. composed of a heterocyclic diol such as 3,9-bis(1,1-dimethyl-2-hydroxyethyl)-2,4,8,10-tetraoxaspiro[5,5]undecane; an aliphatic polyamide-based resin such as 6, 66, 46 and 12; a polyamide-based resin including a semi-aromatic polyamide-based resin, etc. such as 6T, 6I and 9T; a styrene-based resin such as polystyrene resin, high impact polystyrene-based resin, acrylonitrile/styrene-based resin (AS), acrylonitrile/butadiene/styrene-based resin (ABS), acrylonitrile/ethylene propylene (diene)/styrene resin (AES) and crystalline syndiotactic polystyrene resin; an acrylic resin such as PMMA and MBS; a copolymerized polyethylene-based resin such as low-density, medium-density or high-density polyethylene, ethylene/methacrylate copolymer (EMA), ethylene/vinyl acetate copolymer (EVA) and ethylene/glycidyl methacrylate copolymer (E/GMA); an olefin-based resin such as polypropylene-based resin, 4-methyl-pentene-1 resin, cycloolefin polymer (COP) and cycloolefin copolymer (COC); a polyacetal resin, a polyamideimide resin, a polyethersulfone resin, a polyimide resin, a polyphenylene oxide resin, a polyphenylene sulfide resin, a polyphenylsulfone resin, a polyether ether ketone resin, a liquid crystalline polyester resin, a thermoplastic polyurethane resin, a polyvinyl chloride resin, a thermoplastic resin such as fluororesin, and a mixture thereof.

Among these, preferred are a polyester-based resin composed of an aromatic polyester-based resin, a saturated polyester-based resin or the like, and a polycarbonate resin composed of an aromatic polycarbonate-based resin or the like and free from a structural unit derived from a dihydroxy compound represented by formula (1).

Furthermore, of these, the polyester-based resin is more preferably an aromatic polyester-based resin such as polyethylene terephthalate, polypropylene terephthalate, polybutylene terephthalate and polycyclohexanedimethanol terephthalate, and the polycarbonate resin composed of an aromatic polycarbonate-based resin or the like and free from a structural unit derived from a dihydroxy compound represented by formula (1) is more preferably an aromatic polycarbonate-based resin composed of various bisphenols such as bisphenol A and bisphenol Z.

One of these thermoplastic resins may be used, or two or more thereof may be mixed and used, and the thermoplastic resin can be appropriately selected and used by taking into account the properties required according to the intended use, such as heat resistance, chemical resistance and moldability. Furthermore, the thermoplastic resin may be used after applying thereto graft modification or terminal modification with an unsaturated compound such as maleic anhydride.

<Additives, Etc.>

In the present invention, various additives such as heat stabilizer, antioxidant, ultraviolet absorber, light stabilizer and bluing agent, a branching agent, and a foam adjusting agent may be blended each in a predetermined amount with the above-described polycarbonate resin, if desired.

For example, in the present invention, a heat stabilizer may be blended with the above-described polycarbonate resin or polycarbonate resin composition so as to prevent reduction in the molecular weight or deterioration of the hue from occurring at the molding or the like.

The heat stabilizer includes, for example, phosphorous acid, phosphoric acid, phosphonous acid, phosphonic acid, and esters thereof. Specific examples thereof include triphenyl phosphite, tris(nonylphenyl)phosphite, tris(2,4-di-tert-butylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite, bis(2,4-di-tert-butylphenyl)pentaerythritol diphosphite, distearylpentaerythritol diphosphite, tributyl phosphate, triethyl phosphate, trimethyl phosphate, triphenyl phosphate, diphenylmonoorthoxenyl phosphate, dibutyl phosphate, dioctyl phosphate, diisopropyl phosphate, tetrakis(2,4-di-tert-butylphenyl) 4,4'-biphenylenediphosphinate, dimethyl benzenephosphonate, diethyl benzenephosphonate, and dipropyl benzenephosphonate.

Among these, preferred are trisnonylphenyl phosphite, trimethyl phosphate, tris(2,4-di-tert-butylphenyl)phosphite, bis(2,4-di-tert-butylphenyl)pentaerythritol diphosphite, bis(2,6-di-tert-butyl-4-methylphenyl)pentaerythritol diphosphite, and dimethyl benzenephosphonate.

One of these heat stabilizers may be used alone, or two or more thereof may be used in combination.

The heat stabilizer may be further additionally blended in addition to the amount added at the melt polymerization. That is, when a polycarbonate resin is obtained by blending an appropriate amount of a phosphorous acid compound or phosphoric acid compound and thereafter, a phosphorous acid compound is further blended, a larger amount of a heat stabilizer can be blended while avoiding increase in the haze, coloration and reduction in the heat resistance during polymerization, and deterioration of the hue can be prevented.

The blending amount of the heat stabilizer is preferably 0.0001 parts by mass or more, more preferably 0.0005 parts by mass or more, still more preferably 0.001 parts by mass or more, and is preferably 1 part by mass or less, more preferably 0.5 parts by mass or less, still more preferably 0.2 parts by mass or less, per 100 parts by mass in total of the polycarbonate resin and the thermoplastic resin blended, if desired.

Also, in the present invention, an antioxidant may be blended with the above-described polycarbonate resin or polycarbonate resin composition for the purpose of preventing oxidation.

The antioxidant includes, for example, pentaerythritol tetrakis(3-mercaptopropionate), pentaerythritol tetrakis(3-laurylthiopropionate), glycerol-3-stearylthiopropionate, triethylene glycol-bis[3-(3-tert-butyl-5-methyl-4-hydroxyphenyl) propionate], 1,6-hexanediol-bis[3-(3,5-di-tert-butyl-4-hydroxyphenyl)propionate], pentaerythritol-tetrakis[3-(3,5-di-tert-butyl-4-hydroxyphenyl)propionate], octadecyl-3-(3,5-di-tert-butyl-4-hydroxyphenyl)propionate, 1,3,5-trimethyl-2,4,6-tris(3,5-di-tert-butyl-4-hydroxybenzyl) benzene, N,N-hexamethylenebis(3,5-di-tert-butyl-4-hydroxy-hydrocinnamide), 3,5-di-tert-butyl-4-hydroxy-benzylphosphonate-diethyl ester, tris(3,5-di-tert-butyl-4-hydroxybenzyl)isocyanurate, tetrakis(2,4-di-tert-butylphenyl) 4,4'-biphenylenediphosphinate, and 3,9-bis{1,1-dimethyl-2-[β-(3-tert-butyl-4-hydroxy-5-methylphenyl) propionyloxy]ethyl}-2,4,8,10-tetraoxaspiro(5,5)undecane.

One of these antioxidants may be used alone, or two or more thereof may be used in combination.

The blending amount of the antioxidant is preferably 0.0001 parts by mass or more, more preferably 0.01 parts by mass or more, and is preferably 0.5 parts by mass or less, more preferably 0.3 parts by mass or less, per 100 parts by mass in total of the polycarbonate resin and the thermoplastic resin blended, if desired.

Also, in the present invention, a release agent can be blended with the above-described polycarbonate resin or polycarbonate resin composition for enhancing the roll releasability from a cooling roll at the extrusion molding or the releasability from a mold at the injection molding.

The release agent includes, for example, a higher fatty acid ester of monohydric or polyhydric alcohol, a higher fatty acid, paraffin wax, bees wax, an olefin-based wax, an olefin-based wax containing a carboxy group and/or a carboxylic acid anhydride group, silicone oil, and organopolysiloxane.

The higher fatty acid ester is preferably, for example, a partial or complete ester of a monohydric or polyhydric alcohol having a carbon number of 1 to 20 with a saturated fatty acid having a carbon number of 10 to 30.

The partial or complete ester of a monohydric or polyhydric alcohol with a saturated fatty acid includes, for example, stearic acid monoglyceride, stearic acid diglyceride, stearic acid triglyceride, stearic acid monosorbitate, stearyl stearate, behenic acid monoglyceride, behenyl behenate, pentaerythritol monostearate, pentaerythritol tetrastearate, pentaerythritol tetrapelargonate, propylene glycol monostearate, palmityl palmitate, butyl stearate, methyl laurate, isopropyl palmitate, biphenyl biphenate, sorbitan monostearate, and 2-ethylhexyl stearate.

Among these, stearic acid monoglyceride, stearic acid triglyceride, pentaerythritol tetrastearate, and behenyl behenate are preferred.

The higher fatty acid is preferably, for example, a saturated fatty acid having a carbon number of 10 to 30. Examples of such a fatty acid include myristic acid, lauric acid, palmitic acid, stearic acid, and behenic acid.

One of these release agents may be used alone, or two or more thereof may be mixed and used.

The blending amount of the release agent is preferably 0.01 parts by mass or more, more preferably 0.1 parts by mass or more, and is preferably 5 parts by mass or less, more preferably 1 part by mass or less, per 100 parts by mass in total of the polycarbonate resin and the thermoplastic resin blended, if desired.

Also, in the present invention, an ultraviolet absorber or a light stabilizer may be blended with the above-described polycarbonate resin or polycarbonate resin composition for the purpose of preventing discoloration due to an ultraviolet ray.

The ultraviolet absorber or light stabilizer includes, for example, 2-(2'-hydroxy-5'-tert-octylphenyl)benzotriazole, 2-(3-tert-butyl-5-methyl-2-hydroxyphenyl)-5-chlorobenzotriazole, 2-(5-methyl-2-hydroxyphenyl)benzotriazole, 2-[2-hydroxy-3,5-bis(α,α-dimethylbenzyl)phenyl]-2H-benzotriazole, 2,2'-methylenebis(4-cumyl-6-benzotriazolephenyl), and 2,2'-p-phenylenebis(1,3-benzoxazin-4-one).

One of these ultraviolet absorbers or light stabilizers may be used alone, or two or more thereof may be used in combination.

The blending amount of the ultraviolet absorber or light stabilizer is preferably 0.001 parts by mass or more, more preferably 0.01 parts by mass or more, and is preferably 2 parts by mass or less, more preferably 0.5 parts by mass or less, per 100 parts by mass in total of the polycarbonate resin and the thermoplastic resin blended, if desired.

Also, in the present invention, a bluing agent may be blended with the above-described polycarbonate resin or polycarbonate resin composition for eliminating a yellowish tint of a civil engineering and construction material/part, which is attributable to the polymer or ultraviolet absorber.

The bluing agent is not particularly limited as long as it is used for the existing polycarbonate resin, but an anthraquinone-based dye is preferred.

Specifically, examples thereof include Solvent Violet 13 [CA. No. (Color Index No.) 60725], Solvent Violet 31 (CA. No. 68210), Solvent Violet 33 (CA. No. 60725), Solvent Blue 94 (CA. No. 61500), Solvent Violet 36 (CA. No. 68210), Solvent Blue 97 ("Macrolex Violet RR", produced by Bayer AG), and Solvent Blue 45 (CA. No. 61110).

One of these bluing agents may be used alone, or two or more thereof may be used in combination.

The blending amount of the bluing agent is usually $0.1 \times 10^{-5}$ parts by mass or more, preferably $0.1 \times 10^{-4}$ parts by mass or more, and is usually $2 \times 10^{-1}$ parts by mass or less, preferably $0.5 \times 10^{-1}$ parts by mass or less, per 100 parts by mass in total of the polycarbonate resin and the thermoplastic resin blended, if desired.

Also, in the present invention, it is preferable to blend a branching agent (hereinafter, sometimes referred to as "compound (B)") with the above-described polycarbonate resin or polycarbonate resin composition or mix a branching agent at the stage of producing the polycarbonate, because the foaming properties can be enhanced (bubble size refinement).

<Blending of Branching Agent (Compound (B))>

In the present invention, the branching agent that can be used by blending it with the polycarbonate resin or polycarbonate resin composition is a compound containing at least one functional group selected from the group consisting of carbodiimide, isocyanate, epoxy, silane, an acid anhydride and oxazoline, and at least one member selected from these compounds must be used.

The compound (B) has the above-described functional group capable of binding to the terminal hydroxyl group of the polycarbonate resin. Therefore, by blending the compound (B), terminal hydroxyl groups of the polycarbonate resin can be bound to each other to increase the molecular weight or create branching and thereby provide a material having strain-hardening property and being suitable for foam-molding. Here, this compound has two or more per molecule of the above-described functional group. However, the above-described functional group reacts with water or an aromatic monohydroxy compound in the polycarbonate resin and therefore, the compound preferably has three or more per molecule of the functional group so as to efficiently bind polymer chains to each other.

As the compound (B) containing two or more per molecule of the above-described functional group, for example, a polymer or oligomer obtained by copolymerizing a monomer having the functional group through polycondensation or vinyl polymerization can be used. If the molecular weight of the compound (B) is too large, its compatibility with the polycarbonate resin becomes bad and in turn, a resin composition obtained by blending the compound (B) and kneading the resin may be clouded white. In view of compatibility, the molecular weight of the compound (B) is preferably low. In addition, the transparency of the resin composition after kneading can be enhanced by adjusting the copolymerization monomer combined or the copolymerization composition to facilitate compatibilization with the polycarbonate resin or regulate the refractive index.

As the compound having two or more carbodiimide groups per molecule, specifically, it is preferable in view of ease of handling and good reactivity to use, for example, poly(4,4'-diphenylmethanecarbodiimide), poly(p-phenylenecarbodiimide), poly(m-phenylenecarbodiimide), poly(tolylcarbodiimide), poly(diisopropylphenylenecarbodiimide), poly(methyl-diisoproppylphenylenecarbodiimide) and poly(triisopropylphenylenecarbodiimide), and among others, a polycarbodiimide compound, trade name "CARBODILITE", produced by Nisshinbo Chemical Inc. is preferred in view of industrial availability.

As the compound having two or more isocyanate groups per molecule, it is preferable in view of ease of handling and good reactivity to use, for example, tolylene diisocyanate (TDI), diphenylmethane diisocyanate (MDI), carbodiimide-modified diphenylmethane diisocyanate, polymethylene polyphenyl isocyanate, phenylene diisocyanate, naphthalene-1,5-diisocyanate, o-toluidine diisocyanate, triphenylmethane triisocyanate, tris(isocyanatephenyl)thiophosphate, isopropylbenzene-2,4-diisocyanate, xylylene diisocyanate (XDI) and tetramethylxylylene diisocyanate (TMXDI), and among others, a polyisocyanate compound, trade name "MILLIONATE", produced by Nippon Polyurethane Industry Co., Ltd. is preferred in view of industrial availability.

As the compound having two or more epoxy groups per molecule, it is preferable in view of ease of handling and good reactivity to use 2,3-epoxypropyl methacrylate glycidyl terephthalate, diglycidyl ortho-phthalate, diglycidyl hexahydrophthalate, tetrafunctional epoxy nitride (e.g., TETRAD D produced by Mitsubishi Gas Chemical Industries Ltd.), polyethylene glycol diglycidyl ether, polypropylene diglycidyl ether, bisphenol diglycidyl ether, neopentyl glycol diglycidyl ether, 1,6-hexanediol diglycidyl ether, glycerin diglycidyl ether, trimethylolpropane triglycidyl ether, hydrogenated BPA diglycidyl ether, 2,2-dibromoneopentyl glycol diglycidyl ether, and a polyepoxy group-containing modified acrylic copolymer (e.g., "Joncryl" UVA3070PET (a masterbatch prepared at a ratio of resin additive ADR-4370S produced by BASF:PET=3:7)), and among others, diglycidyl terephthalate, diglycidyl ortho-phthalate, diglycidyl hexahydrophthalate, tetrafunctional epoxy nitride, and a polyepoxy group-containing modified acrylic copolymer are preferred.

As the compound having two or more silane groups per molecule, it is preferable in view of ease of handling and good reactivity to use, for example, trimethoxymethylsilane, triethoxyphenylsilane, tetramethoxysilane, tetraethoxysilane and tetra-n-propoxysilane, and among others, tetraethoxysilane is preferred.

As the compound having two acid anhydride groups per molecule, it is preferable in view of ease of handling and good reactivity to use, for example, pyromellitic anhydride, naphthalene tetracarboxylic anhydride, benzophenone tetracarboxylic dianhydride, cyclopentane tetracarboxylic anhydride, ethylene glycol (anhydrotrimellitate) and glycerol (anhydrotrimellitate), and among these, pyromellitic anhydride and benzophenone tetracarboxylic anhydride are preferred.

As the compound having two or more oxazoline groups per molecule, it is preferable in view of ease of handling and good reactivity to use, for example, 2,2'-bis-(2-oxazoline), 2,2'-methylene-bis-(2-oxazoline), 2,2'-ethylene-bis-(2-oxazoline), 2,2'-trimethylene-bis-(2-oxazoline), 2,2'-tetramethylene-bis-(2-oxazoline), 2,2'-hexamethylene-bis-(2-oxazoline), 2,2'-octamethylene-bis-(2-oxazoline), 2,2'-ethylene-bis-(4,4'-dimethyl-2-oxazoline), 2,2'-p-phenylene-bis-(2-oxazoline), 2,2'-m-phenylene-bis-(2-oxazoline), 2,2'-m-phenylene-bis-(4,4'-dimethyl-2-oxazoline), bis-(2-oxazolinylcyclohexane) sulfide, bis-(2-oxazolinylnorbornane) sulfide, and an oxazoline group-containing polymer, and among these, an oxazoline group-containing polymer is preferred.

The compound having three or more per molecule of the above-described functional group can be synthesized, for example, by copolymerizing a vinyl monomer having the functional group with a vinyl polymerization-type resin such as polyethylene, polypropylene, polyvinyl alcohol, polymethyl methacrylate and polystyrene. For example, the following monomers are used:

isocyanate: an isocyanate group-containing (meth)acrylic acid ester such as 2-isocyanatoethyl methacrylate, and an isocyanate-group containing styrene, epoxy: an epoxy group-containing (meth)acrylic acid ester such as glycidyl methacrylate, and an epoxy group-containing styrene, silane: an alkoxysilane group-containing vinyl monomer such as vinyltrialkoxysilane, vinylalkyltrialkoxysilane, trialkoxysilylnorbornene, p-styryltrialkoxysilane and 3-methacryloxyalkyltrialkoxysilane, acid anhydride: a carboxylic acid anhydride such as maleic anhydride, and oxazoline: an oxazoline group-containing vinyl monomer such as 2-vinyl-2-oxazoline and 2-isopropenyl-2-oxazoline.

As the carbodiimide compound, for example, those synthesized by subjecting various polyisocyanates to a decarboxylation condensation reaction using an organophosphorus-based compound or organometallic compound as the catalyst at a temperature of about 70° C. or more without a solvent or in an inert solvent may be used. As the polycarbodiimide compound contained in the carbodiimide compound, those produced by various methods may be used, but, fundamentally, a compound produced by a conventional production method for polycarbodiimide (for example, U.S. Pat. No. 2,941,956, JP-B-47-33279 (the term "JP-B" as used herein means an "examined Japanese patent publication"), J. Org. Chem. 28, 2069-2075 (1963), and Chemical Review 1981, Vol. 8, No. 4, pp. 619-621) can be used.

The organic diisocyanate that is a synthesis raw material in the production of the polycarbodiimide compound includes, for example, an aromatic diisocyanate, an aliphatic diisocyanate, an alicyclic diisocyanate, and a mixture thereof, and specific examples thereof include 1,5-naphthalene diisocyanate, 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, a mixture of 2,4-tolylene diisocyanate and 2,6-tolylene diisocyanate, hexamethylene diisocyanate, cyclohexane-1,4-diisocyanate, xylylene diisocyanate, isophorone diisocyanate, dicyclohexylmethane-4,4'-diisocyanate, methylcyclohexane diisocyanate, tetramethylxylylene diisocyanate, 2,6-diisopropylphenyl isocyanate, and 1,3,5-triisopropylbenzene-2,4-diisocyanate.

Preferable examples of the carbodiimide compound include 4,4'-dicyclohexylmethanecarbodiimide (degree of polymerization=3 to 20), tetramethylenexylylenecarbodiimide (degree of polymerization=3 to 20), N,N-dimethylphenylcarbodiimide (degree of polymerization=3 to 20), and N,N'-di-2,6-diisopropylphenylcarbodiimide (degree of polymerization=3 to 20). One of these compounds may be used alone, or two or more thereof may be used in combination.

The blending amount of the compound (B) is preferably 0.01 parts by mass or more, more preferably 0.05 parts by mass or more, still more preferably 0.1 parts by mass or more, and is preferably 5 parts by mass or less, preferably 3 parts by mass or less, per 100 parts by mass in total of the polycarbonate resin and the thermoplastic resin. If the blending amount of the compound (B) (branching agent) is less than 0.01 parts by mass, the effects of the present invention, such as improvement of moldability of the polycarbonate resin composition, are not sufficiently brought out, whereas if the blending amount exceeds 5 parts by mass, a gel component is produced in the polycarbonate resin composition, making it difficult to perform stable molding.

The compound (B) is preferably blended and kneaded with the polycarbonate resin by using an extruder, similarly to the above-described heat stabilizer, etc. As for the extruder used, when an aromatic hydroxy compound or water in the polycarbonate resin is vacuum devolatilized along with kneading by using a vented twin-screw extruder, the effect of suppressing reduction in the molecular weight during melting, which is exerted by the compound (B), is likely to be efficiently brought out. At the time of kneading the compound (B) and the polycarbonate resin, the devolatilization rate of an aromatic monohydroxy compound in the polycarbonate resin preferably becomes 20% or more. Also, if the resin temperature rises excessively during kneading, desired properties may not be obtained due to thermal decomposition of the polycarbonate resin or compound (B). Therefore, the extruder outlet resin temperature is preferably adjusted to 280° C. or less, more preferably 270° C. or less, still more preferably 260° C. or less. Due to limitations of melt viscosity of the resin and power of the extruder, the lower limit is preferably adjusted to 200° C. or more, more preferably 210° C. or more, still more preferably 220° C. or more. The extruder outlet resin temperature can be adjusted, for example, by the throughput of resin, the rotation speed of screw, the temperature setting of cylinder, or the selection of screw element.

<Copolymerization of Branching Agent>

In the present invention, at the production of the polycarbonate for use in the polycarbonate resin and polycarbonate resin composition, a branching agent may be mixed and reacted to produce the polycarbonate, whereby a branching agent structure is copolymerized and introduced into the polycarbonate resin. That is, the polycarbonate resin is preferably a resin containing a structural unit derived from a compound having three or more hydroxy groups in the molecule.

In the case of introducing a branching agent through copolymerization, the later-described compound structure is introduced into the polycarbonate structure.

The polycarbonate resin of the present invention may contain a structural unit derived from a compound having three or more hydroxy groups in the molecule, in an amount of 0.2 to 2 mol % based on structural units derived from all dihydroxy compounds constituting the resin. By having an appropriate branching degree, the polycarbonate resin can be a material having strain-hardening property and being suitable for foam-molding.

If the branching degree is increased excessively, gelling of the resin may occur. Therefore, in view of easy control of the branching degree, the number of hydroxy groups per molecule is preferably 20 or less, more preferably 12 or less, still more preferably 8 or less, yet still more preferably 6 or less. Also, the structural unit derived from a compound having three or more hydroxy groups in the molecule is preferably contained in an amount of 0.2 to 2 mol %, more preferably from 0.3 to 1.5 mol %, still more preferably from 0.4 to 1.0 mol %.

Specific examples of the compound having three or more hydroxy groups in the molecule include trimethylolethane, trimethylolpropane, 1,2,6-hexanetriol, pentaerythritol, dipentaerythritol, tripentaerythritol, tetrapentaerythritol, adamantanetriol, glycerin, erythritol, sorbitol, 1,4-anhydrosorbitol, 1,5-anhydrosorbitol, 1,2,4-butanetriol, 1,2,5-pentanetriol, 1,2,3,4-pentanetetrol, 2,3,4,5-hexanetetrol, 1,3,5-trihydroxybenzene, 1,3,5-tris(4-hydroxyphenyl)-benzene, tris(4-hydroxyphenyl)methane, tetrakis(4-hydroxyphenyl)methane, 1,1,1-tris(4-hydroxyphenyl)ethane, 1,1,1-tris(4-hydroxyphenyl)propane, α,α,α'-tris(4-hydroxyphenyl)-1-ethyl-4-isopropylbenzene, tris(3-methyl-4-hydroxyphenyl)methane, 1,1,1-tris(3-methyl-4-hydroxyphenyl)ethane, 1,1,1-tris(3-methyl-4-hydroxyphenyl)propane, tris(3,5-dimethyl-4-hydroxyphenyl)methane, 1,1,1-tris(3,5-dimethyl-4-hydroxyphenyl)ethane, 1,1,1-tris(3,5-dimethyl-4-hydroxyphenyl)propane, 1,1,1-tris(4-hydroxyphenyl)-1-phenylmethane, 2,4,4'-trihydroxybenzophenone, 2,4,6-trihydroxybenzophenone, 2,4,4'-trihydroxydiphenyl ether, 2,2',4,4'-tetrahydroxybenzophenone, and resveratrol. A compound having an alcoholic hydroxy group is preferred in view of reactivity of the hydroxy group, and trimethylolpropane, pentaerythritol and dipentaerythritol are preferred in view of ease of industrial availability. Incidentally, the hydroxy group of the later-described hindered phenol compound used as a heat stabilizer does not have sufficient polymerization reactivity, and this compound is not used as a branching agent.

The method for blending a compound having three or more hydroxy groups in the molecule with the polycarbonate resin includes a method of copolymerizing the compound together with other dihydroxy compounds, and a method of adding and reacting the compound in the resin. In particular, a method of copolymerizing the compound is preferred, because the branching effect is readily brought out.

Also, in the present invention, a foam adjusting agent can be blended for achieving smooth foaming at the time of foam-molding the above-described polycarbonate resin or polycarbonate resin composition.

The foam adjusting agent includes, for example, a plate-like, powdery or fibrous inorganic compound such as talc, silica, alumina, mica, calcium carbonate, wollastonite, montmorillonite and kaolin. Such an inorganic compound may be surface-treated, for example, with a silane coupling agent, a titanate-based coupling agent, an Si—H bond-containing silicone-based compound or an organosiloxane compound. Other than those described above, for example, an acidic salt of polyvalent carboxylic acid and a mixture of polyvalent carboxylic acid and sodium carbonate or sodium bicarbonate are also preferred as the foam adjusting agent.

One of these foam adjusting agents may be used alone, or two or more thereof may be used in combination.

The blending amount of the foam adjusting agent is preferably 0.1 parts by mass or more, more preferably 0.3 parts by mass or more, and is preferably 50 parts by mass or less, more preferably 10 parts by mass or less, per 100 parts by mass in total of the polycarbonate resin and the thermoplastic resin blended, if desired.

Blending of the polycarbonate resin and thermoplastic resin for use in the present invention with various additives can be performed by a method that is known per se and employed usually. Examples thereof include a method of mixing those components by a tumbler, a V-blender, a super-mixer, a Nauter mixer, a Banbury mixer, a kneading roll, an extruder or the like, and a solution blending method of mixing those components each in a state of being dissolved in a common good solvent such as methylene chloride.

The strain-hardening factor of uniaxial extensional viscosity of the polycarbonate resin composition of the present invention is 0.1 or more, preferably 0.15 or more, more preferably 0.2 or more, and is 5 or less, preferably 4 or less, more preferably 3 or less.

The strain-hardening factor as referred to in the present invention can be evaluated, for example, by a technique analogous to the method disclosed in JP-A-2006-69146. That is, in the transient response of uniaxial extensional viscosity deviating from a region where the uniaxial extensional viscosity gradually rises (linear region) with an increase in the uniaxial extensional strain ($\in$) after the initiation of measurement and reaching a region where the uniaxial extensional viscosity sharply rises (non-linear region), the strain-hardening factor of uniaxial extensional viscosity of the present invention is an indication of the extent of rise of the uniaxial extensional viscosity in the non-linear region. The strain-hardening factor can be evaluated by the later-described method. Here, the uniaxial extensional strain ($\in$) is the Hencky strain and is indicated by the product of uniaxial elongation rate and time.

First, the transient responsiveness of uniaxial extensional viscosity at an uniaxial elongation rate of 4.0 sec$^{-1}$ or 0.1 sec$^{-1}$ is measured at a measurement temperature of 240° C. by using a viscoelasticity measuring apparatus (for example, trade name: ARES, manufactured by TA Instruments) and an extensional viscosity measuring jig (for example, trade name: ARES-EVF, manufactured by TA Instruments). Here, the uniaxial extensional viscosities at uniaxial elongation rates of 4.0 sec$^{-1}$ and 0.1 sec$^{-1}$ are designated as $\eta_1$ and $\eta_2$, respectively. Incidentally, the uniaxial extensional strain ($\in$) at a uniaxial elongation rate of 4.0 sec$^{-1}$ for a measurement time of 0.375 to 0.75 seconds is from 1.5 to 3.0, and the uniaxial extensional viscosity $\eta_1$ in this range comes under a non-linear region. On the other hand, the uniaxial extensional strain ($\in$) at a uniaxial elongation rate of 0.1 sec$^{-1}$ for a measurement time of 0.375 to 0.75 seconds is from 0.0375 to 0.075, and the uniaxial extensional viscosity $\eta_2$ in this range comes under a linear region.

Next, the natural logarithm ($\ln(\eta_1/\eta_2)$) of $\eta_1/\eta_2$ calculated from $\eta_1$ and $\eta_2$ is determined in the range where the uniaxial extensional strain ($\in$) at a uniaxial elongation rate of 4.0 sec$^{-1}$ is from 1.5 to 3.0, and the uniaxial extensional strain ($\in$) and $\ln(\eta_1/\eta_2)$ are plotted on the abscissa and the ordinate, respectively. With respect to the plots, a first-order approximation straight line is determined by the least square method, and the gradient of the first-order approximation straight line is defined as the strain-hardening factor of uniaxial extensional viscosity.

The extent of rise of the viscosity in the range where the thus-determined uniaxial extensional strain is from 1.5 to 3.0 becomes the strain-hardening factor.

When the strain-hardening factor is large, for example, when the uniaxial extensional strain becomes 1.5 or more at the inflation molding, the viscosity rises and therefore, there is produced an effect that bubbles are stabilized or the accuracy of film thickness is enhanced.

The method for causing the polycarbonate resin composition of the present invention to have a strain-hardening factor of uniaxial extensional viscosity in the above-described desired range is not particularly limited, but there is a method of incorporating a branch structure-containing polymer chain into the resin composition and a method of incorporating an ultrahigh molecular weight component having a molecular weight of 50 to 1,000,000 or more into the resin composition. Among these, a method of incorporating a branch structure-containing polymer chain into the polycarbonate resin composition is preferred.

The method for incorporating a branch structure-containing polymer chain is not particularly limited, but, for example, a method of adding a branching agent to produce a branch structure at the production of the polycarbonate resin composition of the present invention, and a method of blending a branch structure-containing polymer chain as one component of the polycarbonate resin composition of the present invention, may be employed.

[3] Molding Method, Usage of Molded Body, Etc.

In the present invention, a molded body of the above-described polycarbonate resin composition can be obtained using a known molding method such as injection molding, extrusion molding, press molding, vacuum molding and laminate molding. Furthermore, a foam-molded body can be obtained by performing injection molding or extrusion molding together with a foaming agent.

In the case of obtaining a foam-molded body by using the polycarbonate resin composition of the present invention, the foaming agent used is not particularly limited, and all of foaming agents such as volatile foaming agent, inorganic foaming agent and decomposition-type foaming agent can be used.

The volatile foaming agent includes, for example, a lower aliphatic hydrocarbon compound such as n-butane, i-butane, n-pentane, i-pentane and hexane; an alicyclic hydrocarbon compound such as cyclobutane and cyclopentane; an aromatic hydrocarbon compound such as benzene, toluene and xylene; a lower aliphatic monohydric alcohol compound such as methanol and ethanol; a lower aliphatic ketone compound such as acetone and methyl ethyl ketone; and a low-boiling-point halogenated hydrocarbon compound such as chloromethane, chloroethane and 1-chloro-1,1-difluoroethane.

The inorganic foaming agent includes, for example, nitrogen, carbon dioxide and water, which are in any one of gas, supercritical and subcritical states.

The decomposition-type foaming agent includes, for example, an azo compound such as barium azocarboxylate and azodicarbonamide, a nitroso compound such as N,N'-dinitrosopentamethylenetetramine, a hydrazine compound such as hydrazocarbonamide, and a bicarbonate such as sodium bicarbonate.

Among these, nitrogen and carbon dioxide each in a supercritical or subcritical state, and a mixture thereof are preferred.

One of these foaming agents may be used alone, or two or more thereof may be used in combination.

The amount of the foaming agent can be appropriately determined according to the kind of the foaming agent or the expansion ratio but is preferably 0.1 parts by mass or more, more preferably 0.5 parts by mass or more, and is preferably 20 parts by mass or less, more preferably 10 parts by mass or less, per 100 parts by mass of the polycarbonate resin composition.

In the present invention, the foam-molding method is not particularly limited, and, for example, there exists various foam-molding methods such as extrusion foam-molding, injection foam-molding and a method of impregnating the molded body with a foaming agent and then bringing about foaming, but the foam-molding generally consists of the following steps:

1) a step of dissolving (or mixing) a foaming agent in the polymer,
2) a step of generating bubbles,
3) a step of growing the bubbles (this step 3) often proceeds simultaneously with the step 2)), and
4) a step of fixing the bubbles.

Usually, the foam-molding methods are roughly classified into two groups. One is a batch-system foam-molding method, and an example thereof is a method of impregnating the molded body with a foaming agent and then bringing about foaming. In this batch-system foam-molding method, the process temperature is relatively low in general. Also, each of the steps above requires a relatively long time.

As the method of bringing about foaming after impregnating the molded body with a foaming agent, for example, a molded body of the resin composition is placed in an autoclave, a supercritical fluid is added to impregnate the molded body with the supercritical fluid, and thereafter, the pressure is reduced, whereby a foam can be obtained. Also, in the case of a foaming agent capable of foaming under heating, the molded body is impregnated with the foaming agent and then heated, whereby a foam can be obtained.

Another is a continuous foam-molding method, and examples thereof include a foam-molding method using an extrusion molding machine, an injection molding machine, a blow molding machine or the like. In this continuous foam-molding method, the process temperature is relatively high in general. Also, each of the steps above requires a relatively short time.

The extrusion foam-molding includes, for example, (a) a method involving melt-kneading the resin composition and the foaming agent in an extruder, extruding the molten resin from a circular die at the end of the extruder, forming a cylindrical foam in a cylindrical cooling device (mandrel), and cutting open the foam in the extrusion direction to take on a sheet shape, and (b) a method involving melt-kneading the resin composition and the foaming agent in an extruder, extruding the molten resin into a sheet form from a T-die at the end of the extruder, and taking off the sheet-shaped resin by a cooling roll to obtain a sheet.

Incidentally, the foaming agent may be used by previously mixing it with the polycarbonate resin composition or may be injected in the middle of the extruder.

The injection foam-molding includes, for example, (c) a method involving mixing or dissolving the foaming agent in the molten-state resin composition in an injection molding machine and at the injection molding in a mold, filling the mold with the resin composition while foaming the resin, and (d) a method involving mixing or dissolving the foaming agent in the molten-state resin composition in an injection molding machine, applying a pressure during injection filling of a mold by using, for example, a counter pressure or a resin pressure at the injection so as to prevent foaming, and then causing foaming to occur by reducing the pressure, for example, by way of retreat of the movable side of the mold, release of the counter pressure, or shrinkage of the resin composition during cooling.

As the method of bringing about foaming after impregnating the molded body with a foaming agent, for example, a molded body of the resin composition is placed in an autoclave, a supercritical fluid is added to impregnate the molded body with the supercritical fluid, and thereafter, the pressure is reduced, whereby a foam can be obtained. Also, in the case of a foaming agent capable of foaming under heating, the molded body is impregnated with the foaming agent and then heated, whereby a foam can be obtained.

In the present invention, among polycarbonates having a structural unit derived from isosorbide, a polycarbonate copolymer having a structural unit derived from other dihydroxy compounds, particularly a polycarbonate copolymer having a glass transition temperature (Tg) in the specific range, is considered to have appropriate properties, that is, appropriate gas solubility and gas diffusibility, for both the batch-system foam-molding method and the continuous foam-molding method. Therefore, when the composition is foam-molded, a foam-molded body having a sufficient expansion ratio and a good foamed form (the size, number density and independence=no or little open cell of bubble) is obtained, and this is presumed to enable the production of a lightweight foam-molded body having good mechanical properties (elongation).

As described above, in the present invention, the foam-molding method may be either a batch-system foam-molding or a continuous foam-molding method, but a continuous foam-molding method is considered to be preferable. This is because, among polycarbonates having a structural unit derived from isosorbide, a polycarbonate copolymer having a structural unit derived from other dihydroxy compounds, particularly a polycarbonate copolymer having a glass transition temperature (Tg) in the specific range, exhibits gas solubility and gas diffusibility more suitable for the continuous foam-molding process.

Of respective steps of mold-foaming, in the step 1) of dissolving (or mixing) a foaming agent in the polymer, as the gas diffusibility is higher, the gas dissolves at a higher rate, that is, the time required in the step can be shortened.

Also, in the step 3) of growing the bubbles, as the gas diffusibility is higher, the bubble grows at a higher rate.

If the gas diffusibility is too high, the bubble is likely to be coarsened and when the foam-molded body is subject to deformation by an external force, the coarse bubble may work out to a fracture point, leading to reduction in the mechanical properties (elongation).

If the gas diffusibility is too low, the bubble may not sufficiently grow, failing in increasing the expansion ratio, and therefore, the lightweight effect may be reduced.

Among polycarbonates having a structural unit derived from isosorbide for use in the present invention, a polycarbonate copolymer having a structural unit derived from other dihydroxy compounds, particularly a polycarbonate copolymer having a glass transition temperature (Tg) in the specific range, is higher in the gas solubility than a polycarbonate not having a structural unit derived from other dihydroxy compounds or a polycarbonate copolymer having a structural unit derived from other dihydroxy compounds but having a glass transition temperature (Tg) of 145° C. or more, and therefore, a larger amount of gas can be dissolved in the polymer in the gas dissolving step. For this reason, it is expected that a more lightweight foam-molded body is obtained.

On the other hand, when the gas solubility is high, the gas diffusibility is similarly high in many cases. In the case where the gas solubility is high and the gas diffusibility is high, a gas escape from the surface of the molded body is considered to readily occur in the foam-molding process and resin chipping or surface roughening attributable to the gas escape or coarsening of the bubble due to excessively high gas diffusibility may be caused. For this reason, it is not preferred that the gas solubility and the gas diffusibility are excessively high.

Among polycarbonates having a structural unit derived from isosorbide for use in the present invention, a polycarbonate copolymer having a structural unit derived from other dihydroxy compounds, particularly a polycarbonate copolymer having a glass transition temperature (Tg) in the specific range, is higher in the gas diffusibility than a polycarbonate not having a structural unit derived from other dihydroxy compounds or a polycarbonate copolymer having a structural unit derived from other dihydroxy compounds but having a glass transition temperature (Tg) of 145° C. or more, and therefore, the bubble can be sufficiently grown even in the bubble growing step for a relatively short time and at the same time, because of gas diffusibility that is not excessively high, a good foam morphology can be developed, which is presumed to enable obtaining a lightweight foam-molded body having good mechanical properties (elongation).

On the other hand, the gas solubility and the gas diffusibility vary according to the temperature and among polycarbonates having a structural unit derived from isosorbide for use in the present invention, a polycarbonate copolymer having a structural unit derived from other dihydroxy compounds, particularly a polycarbonate copolymer having a glass transition temperature (Tg) in the specific range, can be molded at a lower temperature than a polycarbonate not having a structural unit derived from other dihydroxy compounds, a polycarbonate copolymer having a structural unit derived from other dihydroxy compounds but having a glass transition temperature (Tg) of 145° C. or more, or a general bisphenol-based polycarbonate, so that the gas diffusion coefficient can exist in an appropriate range and the bubble can be avoided from coarsening or the like occurring due to excessively high gas diffusibility.

In the present invention, the molded body of the present invention is preferably obtained by foam-molding the resin composition above with use of the above-described foaming agent according to injection foaming involving expansion of a cavity.

In this case, the injection foam-molding includes, for example, (a) a method involving mixing or dissolving the foaming agent in the molten-state resin composition in an injection molding machine and at the injection molding in a mold, filling the mold with the resin composition while foaming the resin, and (b) a method involving mixing or dissolving the foaming agent in the molten-state resin composition in an injection molding machine, applying a pressure during injection filling of a mold by using, for example, a counter pressure or a resin pressure at the injection so as to prevent foaming, and then causing foaming to occur by reducing the pressure, for example, by way of expansion of a cavity or release of the counter pressure resulting from retreat (core back) or the like of the movable side of the mold or by way of shrinkage of the resin composition during cooling.

In this case, among the methods (b) involving mixing or dissolving the foaming agent in the molten-state resin composition in an injection molding machine, applying a pressure during injection filling of a mold by using, for example, a counter pressure or a resin pressure at the injection so as to prevent foaming, and then causing foaming to occur by reducing the pressure, for example, by way of retreat of the movable side of the mold, release of the counter pressure or shrinkage of the resin composition during cooling, preferred is a method involving mixing or dissolving the foaming agent in the molten-state resin composition in an injection molding machine, applying a pressure during injection filling of a mold by using, for example, a counter pressure or a resin pressure at the injection so as to prevent foaming, and then causing foaming to occur by expanding a cavity, for example, by way of retreat (core back) of the movable side of the mold.

The cavity volume after expansion of the cavity is usually more than 1.1 times, preferably 1.5 times or more, more preferably 2.0 times or more, most preferably 2.5 times or more, and is usually 100 times or less, preferably 50 times or less, more preferably 30 times or less, most preferably 20 times or less, of the cavity volume at the completion of filling with the resin composition.

If the expansion amount of the cavity is small, the lightweight effect may be reduced, whereas if the expansion amount of the cavity is large, the swelling amount of the resin composition due to foaming may become less than the expansion amount of the cavity and a foam-molded body of a desired dimension may not be obtained.

The timing of starting expansion of the cavity is not particularly limited but is usually almost at the same time as the completion of filling of the mold with the resin (within 0.1 seconds before or after the completion of filling) or after the completion of filling, and in the case of after the completion of filling, within 10.0 seconds, preferably within 5.0 seconds, more preferably within 3.0 seconds. If the timing of starting expansion of the cavity is significantly earlier than the completion of filling, foaming by the expansion of the cavity starts in the unfilled state of the mold and therefore, a foam-molded body having a desired dimension and a uniform density may not be obtained, whereas the timing of starting expansion of the cavity is significantly later than the completion of filling, a viscosity rise due to cooling of the resin may occur before expansion of the cavity, making it difficult to achieve foaming.

In the case where the expansion amount of the cavity is equal to the swelling amount of the resin by foaming, a foam-molded body having a volume equal to the mold volume after expansion of the cavity is obtained and therefore, when expansion of the cavity is performed in the thickness direction, the "expansion ratio" can be defined by the ratio [(thickness of foam-molded body)/(thickness of mold before expansion of cavity)] of the "thickness of mold before expansion of cavity" to the "thickness of foam-molded body". This "expansion ratio" becomes equal to (density of resin composition before foaming)/(density of foam-molded body).

The foam-molding temperature is not particularly limited as long as the resin composition can be foam-molded, but the temperature is usually 80° C. or more, preferably 100° C. or more, and is usually 300° C. or less, preferably 260° C. or less.

In more detail, the lower limit of the foam-molding temperature is preferably a temperature higher by 5° C. or more, more preferably higher by 10° C. or more, than the glass transition temperature (Tg) of the polycarbonate resin, and the upper limit is preferably a temperature higher by 200° C. or less, more preferably higher by 150° C. or less, than Tg of the copolymer.

By setting the temperature during foam-molding to the range above, a foam at a desired expansion ratio can be molded while suppressing thermal decomposition of the resin. If the temperature is too high, the resin may be thermally decomposed, whereas if the temperature is too low, the resin viscosity tends to be high, making it difficult to achieve foaming.

The foam-molded body of the present invention in one aspect is characterized in that the average diameter of bubbles in the foam-molded body is 100 µm or less. As the average diameter of bubbles is smaller, the number density of bubbles is increased and in turn, the number of bubble wall (bubble-resin interface) that the incident light encounters is increased, resulting in high reflectance of light. In particular, when the average diameter is 100 µm or less, the reflectance of light becomes sufficiently high and this is effective in use as a light reflective material. Among these, a smaller diameter of bubble brings about better strength/outer appearance of the foam-molded body and therefore, the diameter is preferably 80 µm or less, more preferably 50 µm or less, still more preferably 30 µm or less. Also, in terms of the cell diameter that can be practically configured, the diameter is preferably 0.01 µm or more, more preferably 0.05 µm or more, still more preferably 0.1 µm or more.

Also, in the molded body of the present invention, the expansion ratio and the like are not particularly limited and can be appropriately set, for example, by adjusting the amount of the foaming agent added or the molding method.

The expansion ratio is usually 1.1 times or more, preferably 1.5 times or more, more preferably 2.0 times or more, and is usually 100 times or less, preferably 50 times or less, more preferably 30 times or less.

Incidentally, the expansion ratio as used in the present invention is the value obtained by the method described in Examples. Furthermore, the shape of the foam (molded body) is also not particularly limited and can be appropriately determined according to use or the like.

In the foam-molded body of the present invention, multi-layering or coextrusion with a non-foaming layer or of foaming layers one on another or lamination of a non-foamed resin such as polycarbonate and polyethylene terephthalate to the surface may also be performed. In the case of an injection molded article, after inserting a non-foamed sheet such as polycarbonate into one side or both sides in the mold, injection foam-molding may be performed to make up an integrally molded article of a foam and a non-foamed sheet. At this time, a non-foamed sheet which is, for example, subjected to printing or provided with hardcoat or weather resistance may also be used. Furthermore, printing, an antistatic treatment or a treatment such as hardcoat may be applied to the surface of the molded body above.

[Reason why the Present Invention Provides Effects]

The reason why the present invention provides the effects is not clearly known yet but is presumed as follows. That is, in a normal resin, the resistance of the resin against bubble growth during foam-molding is low, namely, the force to suppress the bubble growth is small, resulting in a high bubble growth rate and in turn, a large bubble diameter, and also, since coalescence of bubbles with each other partially occurs, it is impossible to form a foam-molded body containing microbubbles. However, in the present invention, the polycarbonate resin containing at least a structural unit derived from a dihydroxy compound represented by formula (1) is in itself characterized by a small gas diffusion coefficient and therefore, is considered to hardly allow for a gas escape during foam-molding, making it possible to form a foam-molded body free from an appearance failure or thickness unevenness attributable to a gas escape. Furthermore, in the case where the strain-hardening facture of uniaxial extensional viscosity of a resin composition containing the polycarbonate resin is in the specific range, the viscosity is increased as the resin is extended during foaming and when a foam-molded body is formed, suppression of bubble growth and inhibition of coalescence of bubbles with each other are considered to be thereby achieved. In addition, an effect of increasing the number density of bubbles is expected to be brought about resulting from suppression of bubble growth. Accordingly, a foam-molded body having microbubbles and a large number density of bubbles is considered to be formed. For these reasons, the foam-molded body of the present invention has excellent heat resistance, mechanical properties, etc. Also, the resin composition of the present invention exhibits an excellent foaming performance in the foam-molding, so that a lightweight, high-strength foam-molded body having a good outer appearance and a small bubble diameter can be obtained.

The molded body of the present invention can be used for a member in the electric/electronic field, automotive field, building field and other fields or for a food container, a light reflective material, a heat insulating material, a sound blocking material, a buffer material, a low specific gravity material, a fuel cell separator, a low dielectric material, a separation membrane, etc.

EXAMPLES

The present invention is described in greater detail below by referring to Examples, but the present invention is not limited to these Examples as long as the gist thereof is observed. Incidentally, the values of various production conditions and evaluation results in the following Examples have a meaning as a preferable value of the upper or lower limit in the embodiment of the present invention, and the preferable range may be a range defined by a combination of the upper or lower limit value above and the value in Example below or a combination of values in Examples.

[Evaluation Methods of Characteristics]

In the following Examples, the characteristic evaluations of the resin and other foam-molded bodies were performed by the methods described below. Incidentally, the technique for characteristic evaluations is not limited to the following methods and can be appropriately selected by one skilled in the art.

<Glass Transition Temperature (Tg)>

About 10 mg of the sample was heated at a temperature rise rate of 10° C./min and measured using a differential scanning calorimeter (DSC 822, manufactured by METTLER), and an extrapolation glass transition starting temperature that is a temperature at the intersection of a straight line drawn by extending the low temperature-side base line toward the high temperature side and a tangential line drawn at the point where the curve of the stepwise changing part of glass transition has a maximum gradient, was determined in conformity with JIS-K7121 (1987).

<Color Value b>

The chip color was measured using a color meter (300A, manufactured by Nippon Denshoku Kogyo K.K.).

A predetermined amount of chips were put in a glass cell and measured by reflection measurement to determine the value b.

As this numerical value is smaller, the yellowness is lower.

<Reduced Viscosity>

The reduced viscosity was measured at a temperature of 30.0° C.±0.1° C. by using an automatic viscometer (Ubbelohde viscometer), Model DT-504, manufactured by Chuo Rika Corp. and using a mixed solvent of phenol and 1,1,2,2-tetrachloroethane in a mass ratio of 1:1. The concentration was precisely adjusted to become 1.00 g/dl.

The sample was dissolved with stirring at 120° C. for 30 minutes and after cooling, used for the measurement.

The relative viscosity $\eta_{rel}$ was determined from the flow-through time $t_0$ of the solvent and the flow-through time t of the solution according to the following formula:

$$\eta_{rel}=t/t_0 (\text{g·cm}^{-1}\text{·sec}^{-1})$$

The specific viscosity $\eta_{sp}$ was determined from the relative viscosity $\eta_{rel}$ according to the following formula:

$$\eta_{sp}=(\eta-\eta_0)/\eta_0=\eta_{rel}-1$$

The reduced viscosity (converted viscosity) $\eta_{red}$ was determined by dividing the specific viscosity $\eta_{sp}$ by the concentration c (g/dl) according to the following formula:

$$\eta_{red}=\eta_{sp}/c$$

As this numerical value is higher, the molecular weight is larger.

<5% Thermal Weight Loss Temperature>

Using TG-DTA (SSC-5200, TG/DTA220), manufactured by Seiko Instruments & Electronics Ltd., 10 mg of the sample was placed on an aluminum-made vessel and measured at a temperature rise rate of 10° C./min in the range from 30° C. to 450° C. in a nitrogen atmosphere (nitrogen flow rate: 200 ml/min), and the temperature at which the sample experienced a decrease of 5 mass % was determined.

As this temperature is higher, thermal decomposition is less likely to occur.

<Izod Impact Strength>

Using a mini-max injection molding machine, CS-183MMX, manufactured by Custom Scientific Inc., a test piece having a length of 31.5 mm, a width of 6.2 mm, and a thickness of 3.2 mm was injection-molded at a temperature of 240 to 300° C. and provided with a 1.2 mm-deep notch by a notching machine to prepare a test piece.

This test piece was measured for the notched Izod impact strength at 23° C. by using a mini-max Izod impact tester, Model CS-183TI, manufactured by Custom Scientific Inc.

As this numerical value is larger, the impact strength is higher and cracking is less likely to occur.

<Tensile Test>

A tensile test piece having a parallel-part length of 9 mm and a parallel-part diameter of 1.5 mm was injection-molded using the above-described injection molding machine at a temperature of 240 to 300° C. and by performing a tensile test under the conditions of a tensile speed of 1 cm/min with use of a tensile tester, Model CS-183TE, manufactured by Custom Scientific Inc., the elongation at yield, the tensile strength at yield, the tensile modulus at yield, and the elongation at break were measured.

As each numerical value is larger, the strength or elongation is higher.

<Amount of Gas Evolution>

A resin sample (8 g) vacuum-dried at 100° C. for 5 hours was pressed by a hot press for 1 minute under the conditions of a hot press temperature of 200 to 250° C., a preheating for 1 to 3 minutes and a pressure of 20 MPa by using a spacer having a width of 8 cm, a length of 8 cm and a thickness of 0.5 mm, and then the sample with the spacer was taken out and press-cooled by a water-tube cooling press under a pressure of 20 MPa for 3 minutes to produce a sheet. A sample of 1 cm in width and 2 cm in length was cut out from the sheet. The thickness was 1 mm.

This sample was measured for the evolved gas by the thermal desorption-gas chromatography/mass spectrometry (TDS-GC/MS). As the measuring apparatus, TDS2 manufactured by GERSTEL was used, and the measurement was performed at a thermal desorption temperature of 250° C. for 10 minutes by setting the trap temperature to −130° C.

The sample was placed in a glass chamber, and the gas evolved at 110° C. for 30 minutes with helium at 60 mL/min was collected by a collection tube Tenax-TA.

HP6890/5973N manufactured by Agilent Inc. was used as GC/MS, and HP-VOC: 0.32×60 m and 1.8 μm df was used as the column. After holding at 40° C. for 5 minutes and then raising the temperature to 280° C. at 8° C./min, the sample was held at 280° C. for 25 minutes and measured. The carrier gas was helium at 1.3 mL/min.

The amount of gas evolution was determined as the total evolution amount in terms of toluene per unit area, excluding phenol distilling out during production and phenol-derived benzaldehyde.

<Expansion Ratio>

The ratio [(thickness of foam-molded body)/(thickness of mold before expansion of cavity)] of the "thickness of mold before expansion of cavity" to the "thickness of foam-molded body" was taken as the "expansion ratio".

[Production Example of Polycarbonate (Copolymer)]

In the following Production Example 1, isosorbide used for reaction is produced by Roquette Freres or Sanko Chemical Co., Ltd.; 1,4-cyclohexanedimethanol is produced by Eastman Chemical Co.; diphenyl carbonate is produced by Mitsubishi Chemical Corp.; and cesium carbonate is produced by Wako Pure Chemical Industries Ltd.

Also, abbreviations for compounds used in Production Example 1 are as follows.

ISB: isosorbide
1,4-CHDM: 1,4-cyclohexanedimethanol
DPC: diphenyl carbonate

Production Example 1

Production of Polycarbonate Copolymer (PC-1)

The copolymer was produced as follows in accordance with the method described in Example 1 of JP-A-2009-161746.

A reaction vessel was charged with 13.0 parts by mass (0.246 mol) of 1,4-CHDM, 59.2 parts by mass (0.752 mol) of DPC, and $2.21 \times 10^{-4}$ parts by mass ($1.84 \times 10^{-6}$ mol) of cesium carbonate as a catalyst, per 27.7 parts by mass (0.516 mol) of ISB, and in a nitrogen atmosphere, as a step of the first stage of reaction, the raw materials were dissolved under heating to a heating bath temperature of 150° C. with stirring, if desired (about 15 minutes).

Subsequently, the pressure was reduced from ordinary pressure to 13.3 kPa (absolute pressure; hereinafter, the same) and while raising the heating bath temperature to 190° C. over 1 hour, phenol occurring was drawn out of the reaction vessel.

After holding the whole reaction vessel at 190° C. for 15 minutes, as a step of the second stage, the pressure in the reaction vessel was reduced to 6.67 kPa, and by raising the heating bath temperature to 230° C. over 15 minutes, phenol occurring was drawn out of the reaction vessel. The stirring torque of the stirrer was increased and therefore, the temperature was raised to 250° C. in 8 minutes. For removing further occurring phenol, the pressure in the reaction vessel was caused to reach 0.200 kPa or less, and after arriving at a predetermined stirring torque, the reaction was terminated. The reaction product produced was extruded in water to obtain a pellet of Polycarbonate Copolymer (PC-1).

The reduced viscosity of the obtained Polycarbonate Copolymer (PC-1) was 1.007 dl/g, the glass transition temperature was 124° C., and the color value b was 8.8.

Furthermore, Polycarbonate Copolymer (PC-1) was molded at 245° C. and a mold temperature of 90° C. to obtain a test piece (two kinds) for evaluation of mechanical properties. Evaluations of mechanical properties were performed using these test pieces, as a result, the tensile strength at yield was 84 MPa, the tensile modulus at yield was 748 MPa, the elongation at yield was 16%, the elongation at break was 30%, and the Izod impact strength was 227 J/m$^2$. Also, the 5% thermal weight loss temperature of Polycarbonate Copolymer (PC-1) in a nitrogen atmosphere was 344° C. The amount of evolved gas except for a phenol component was 3.7 ng/cm$^2$, and an evolved gas derived from dihydroxy compounds exclusive of the dihydroxy compound represented by formula (1) was not detected.

Production Example 2

Production of Polycarbonate Copolymer (PC-2)

Production was performed in the same manner as in Production Example 1 except for using 54.2 parts by mass (0.376 mol) of 1,4-CHDM, 0.509 parts by mass ($3.80 \times 10^{-3}$ mol) of trimethylolpropane, 164.72 parts by mass (0.769 mol) of DPC, and $2.68 \times 10^{-4}$ parts by mass ($1.52 \times 10^{-6}$ mol) of calcium acetate monohydrate as a catalyst, per 55.5 parts by mass (0.380 mol) of ISB.

Production Example 3

Production of Polycarbonate Copolymer (PC-3)

Production was performed in the same manner as in Production Example 1 except for using 54.8 parts by mass (0.380 mol) of 1,4-CHDM, 164.32 parts by mass (0.767 mol) of DPC, and $2.68 \times 10^{-4}$ parts by mass ($1.52 \times 10^{-6}$ mol) of calcium acetate monohydrate as a catalyst, per 55.5 parts by mass (0.380 mol) of ISB.

Example 1

Production of Resin Composition 2.1 kg of fully dried Polycarbonate (PC-1) of Production Example 1, 0.9 kg of polybutylene terephthalate (PBT), "NOVADURAN" 5010R5L, produced by Mitsubishi Engineering-Plastics Corporation, and 9.0 g of "Joncryl" UVA3070PET produced by BASF (a masterbatch prepared at a ratio of resin additive ADR-4370S produced by BASF: PET=3:7) were thoroughly mixed (dry blended).

Subsequently, the mixture was melt-kneaded by a twin-screw extrusion kneader ("KZW15-30MG" manufactured by Technovel Corporation) (aperture: 15 mm, L/D=30) under the conditions of 300 rpm and a throughput of 2 kg/hr in a reduced pressure atmosphere and passed though a cooling water bath, and the resulting strand was cut by a strand cutter to obtain a pellet-like resin composition.

The cylinder temperature of the twin-screw extrusion kneader was set to former-stage cylinder temperature: C1=100° C., C2=230° C. and C3=250° C., latter-stage cylinder temperature: C4=250° C., and die temperature: D1=240° C.

Evaluation of Strain-Hardening Factor of Resin Composition

The obtained resin composition was dried by a vacuum dryer for 5 hours or more at 90° C. in a reduced-pressure atmosphere and then molded by a heat press heated to 240° C. At this time, the preheating time was set to 3 minutes, a pressure was applied to reach a predetermined pressure in 1 minute after preheating, and the pressure was maintained another 1 minute. Subsequently, the molded composition was cooled by a cooling press that is temperature-conditioned to 20° C., whereby a test piece having a thickness of 0.6 mm, a width of 10 mm and a length of 18 mm was obtained. This test piece was measured for uniaxial extensional viscosity according to the above-described method by using a viscoelasticity measuring apparatus (trade name: ARES, manufactured by TA Instruments) and an extensional viscosity measuring jig (trade name: ARES-EVF, manufactured by TA Instruments) under the conditions of a temperature of 240° C. and uniaxial elongation rates of 4.0 sec$^{-1}$ and 0.1 sec$^{-1}$ to determine the strain-hardening factor.

Foam-Molding of Resin Composition

The resin composition pellet obtained in <Production of Resin Composition> was dried at 90° C. for 5 hours or more in a hot-air dryer while flowing a nitrogen gas and then charged into the hopper of a MuCell injection molding machine, "J85AD-Mucell", manufactured by JSW, and in the metering process, a physical foaming agent (nitrogen or carbon dioxide) was introduced (injected) into the inside of the cylinder (resin melting part) by applying a pressure as shown in Table 1 to mix the molten resin composition and the physical foaming agent. In all of Examples and Comparative Examples, the metering stroke was set to a value for receiving a full shot when injected into a plate-shaped mold of 1.5 mm (thickness)×100 mm (width)×180 mm (length). Subsequently, the mixture was injected into a plate-shaped mold of 1.5 mm (thickness)×100 mm (width)×180 mm (length) and almost at the same time as the completion of filling (within 0.1 seconds before or after the completion of filling), the movable plate of the mold was retreated (core back) by a predetermined stroke amount (mold opening amount) to perform expansion of the cavity, thereby achieving foam-molding. By cooling as it is for 60 seconds, a foam-molded body was obtained. In this case, the "thickness of mold before expansion of cavity" used for calculation of the expansion ratio was 1.5 mm. The time taken from the initiation of injection to the completion of filling was set to 1.0 seconds, and the time taken to retreat the movable plate of the mold was set to 0.1 seconds. Also, the mold temperature was adjusted to 60° C.

The results are shown in Table 1. Incidentally, Mold Thickness in the Table indicates the "thickness of mold before expansion of cavity".

SEM Observation of Foam-Molded Body

A small piece was cut out from the foaming test piece, and a cutting plane was produced using Ultracut EM UC6 and EM FC6 manufactured by Leica. The obtained specimen was subjected to an electrical conduction treatment using an osmium plasma coater manufactured by Filgen and used as the sample for SEM observation. The SEM observation was performed at a magnification enabling optimal observation of the foam bubble diameter. A digital image obtained by the SEM observation was processed to make clear the contrast of the bubble portion (binarization processing) and subjected to image analysis by an image processing program (Image-Pro6.2J produced by Nippon Roper K.K.), and an operation of calculating the equivalent-circle diameter from, the area of the bubble cross-section was performed. This operation was carried out for at least 40 bubbles per one test piece. From the calculated values, the average diameter of bubbles was determined.

Example 2

Production of Resin Composition

A resin composition was produced in the same manner as in <Production of Resin Composition> of Example 1 except that in <Production of Resin Composition> of Example 1, the resin composition kneaded was changed to contain 2.1 kg of Polycarbonate (PC-1) of Production Example 1, 0.9 kg of polybutylene terephthalate (PBT), "NOVADURAN" 5010R5L, produced by Mitsubishi Engineering-Plastics Corporation, and 30.0 g of "Joncryl" UVA3070PET produced by BASF (a masterbatch prepared at a ratio of resin additive ADR-4370S produced by BASF:PET=3:7).

Evaluation of Strain-Hardening Factor of Resin Composition

The strain-hardening factor of the obtained resin composition was evaluated by the same method as in <Evaluation of Strain-Hardening Factor of Resin Composition> of Example 1.

The result is shown in Table 1.

Foam-Molding of Resin Composition

The obtained resin composition pellet was foam-molded in the same manner as in <Foam-Molding of Resin Composition> of Example 1.

The results are shown in Table 1.

SEM Observation of Foam-Molded Body

The obtained foam-molded body was observed by SEM in the same manner as in <SEM Observation of Foam-Molded Body> of Example 1, and the average bubble diameter was calculated. The results are shown in Table 1.

Example 3

Production of Resin Composition

A resin composition was produced in the same manner as in <Production of Resin Composition> of Example 1 except that in <Production of Resin Composition> of Example 1, the resin composition kneaded was changed to contain 1.5 kg of Polycarbonate (PC-1) of Production Example 1, 1.5 kg of bisphenol A-type polycarbonate, "NOVAREX" 7022IR, produced by Mitsubishi Engineering-Plastics Corporation, and 30.0 g of "Joncryl" UVA3070PET produced by BASF (a masterbatch prepared at a ratio of resin additive ADR-4370S produced by BASF:PET=3:7).

Evaluation of Strain-Hardening Factor of Resin Composition

The strain-hardening factor of the obtained resin composition was evaluated by the same method as in <Evaluation of Strain-Hardening Factor of Resin Composition> of Example 1.

The result is shown in Table 1.

Foam-Molding of Resin Composition

The obtained resin composition pellet was foam-molded in the same manner as in <Foam-Molding of Resin Composition> of Example 1.

The results are shown in Table 1.

SEM Observation of Foam-Molded Body

The obtained foam-molded body was observed by SEM in the same manner as in <SEM Observation of Foam-Molded Body> of Example 1, and the average bubble diameter was calculated.

The results are shown in Table 1.

Example 4

Production of Resin Composition

A resin composition was produced in the same manner as in <Production of Resin Composition> of Example 1 except that in <Production of Resin Composition> of Example 1, the resin composition kneaded was changed to contain 2.1 kg of Polycarbonate (PC-1) of Production Example 1, 0.9 kg of bisphenol A-type polycarbonate, "NOVAREX" 7022IR, produced by Mitsubishi Engineering-Plastics Corporation, and 30.0 g of "Joncryl" UVA3070PET produced by BASF (a masterbatch prepared at a ratio of resin additive ADR-4370S produced by BASF:PET=3:7).

Evaluation of Strain-Hardening Factor of Resin Composition

The strain-hardening factor of the obtained resin composition was evaluated by the same method as in <Evaluation of Strain-Hardening Factor of Resin Composition> of Example 1.

The result is shown in Table 1.

Foam-Molding of Resin Composition

The obtained resin composition pellet was foam-molded in the same manner as in <Foam-Molding of Resin Composition> of Example 1.

The results are shown in Table 1.

SEM Observation of Foam-Molded Body

The obtained foam-molded body was observed by SEM in the same manner as in <SEM Observation of Foam-Molded Body> of Example 1, and the average bubble diameter was calculated.

The results are shown in Table 1.

Example 5

Evaluation of Strain-Hardening Factor of Polycarbonate (PC-2)

The strain-hardening factor of Polycarbonate (PC-2) of Production Example 2 was evaluated by the same method as in <Evaluation of Strain-Hardening Factor of Resin Composition> of Example 1.

The result is shown in Table 1.

Foam-Molding of Polycarbonate (PC-2)

Polycarbonate (PC-2) of Production Example 2 was foam-molded in the same manner as in <Foam-Molding of Resin Composition> of Example 1.

The results are shown in Table 1.

SEM Observation of Foam-Molded Body

The obtained foam-molded body was observed by SEM in the same manner as in <SEM Observation of Foam-Molded Body> of Example 1, and the average bubble diameter was calculated. The results are shown in Table 1.

Comparative Example 1

Evaluation of Strain-Hardening Factor of Polycarbonate 7022IR (Bisphenol A-Type PC)

The extensional viscosity of bisphenol A-type polycarbonate, "NOVAREX" 702218, produced by Mitsubishi Engineering-Plastics Corporation was measured by the same method as in <Evaluation of Strain-Hardening Factor of Resin Composition> of Example 1 to evaluate the strain-hardening factor, as a result, the strain-hardening property was not observed and therefore, the strain-hardening factor could not be evaluated.

Foam-Molding of Polycarbonate 7022IR (Bisphenol A-Type PC)

A bisphenol A-type polycarbonate, "NOVAREX" 702218, produced by Mitsubishi Engineering-Plastics Corporation was foam-molded in the same manner as in <Foam-Molding of Resin Composition> of Example 1.

In the obtained molded body, particularly at the end part on the downstream side of the molten resin inflow, resin chipping or surface roughening presumed to be attributable to gas escape was observed almost throughout the molded article, and thus, the molded body could not withstand practical use.

The results are shown in Table 1.

Comparative Example 2

Evaluation of Strain-Hardening Factor of Polybutylene Terephthalate 5010R5L

The extensional viscosity of polybutylene terephthalate (PBT), "NOVADURAN" 5010R5L, produced by Mitsubishi Engineering-Plastics Corporation was measured by the same method as in <Evaluation of Strain-Hardening Factor of Resin Composition> of Example 1 to evaluate the strain-hardening factor, as a result, the strain-hardening property was not observed and therefore, the strain-hardening factor could not be evaluated.

Foam-Molding of Polybutylene Terephthalate 5010R5L

A polybutylene terephthalate (PBT), "NOVADURAN" 5010R5L, produced by Mitsubishi Engineering-Plastics Corporation was foam-molded in the same manner as in <Foam-Molding of Resin Composition> of Example 1.

A plurality of coarse bubbles (diameter: approximately from 5 to 10 mm) recognizable with a naked eye were included inside the obtained molded body, and a plurality of troughs/ridges considered attributable to the coarse bubbles were observed on the surface of the molded body. In particular, in the site where a coarse bubble existed, "bulging" was observed on the surface of the molded article. Due to these troughs/ridges, the thickness of the foam-molded body that should be originally in a plate shape having a uniform thickness was varied depending on the measurement site and was 2.8 mm in the small thickness portion and 4.6 mm in the large thickness portion, leading to a bat outer appearance.

The results are shown in Table 1. In the evaluation of foam moldability, "B" indicates that foam-molding could be performed but troughs/ridges were observed on the surface of the molded body. Also, since the thickness was greatly varied depending on the measurement site as described above, the expansion ratio was not calculated and denoted by "-".

SEM Observation of Foam-Molded Body

The obtained foam-molded body was observed by SEM in the same manner as in <SEM Observation of Foam-Molded Body> of Example 1, and the average bubble diameter was calculated. The results are shown in Table 1.

Comparative Example 3

Evaluation of Strain-Hardening Factor of Polycarbonate M7027BF (Bisphenol A-Type PC)

The strain-hardening factor of bisphenol A-type polycarbonate, "NOVAREX" M7027BF, produced by Mitsubishi Engineering-Plastics Corporation was evaluated by the same method as in <Evaluation of Strain-Hardening Factor of Resin Composition> of Example 1.

The result is shown in Table 1.

Foam-Molding of Polycarbonate M7027BF (Bisphenol A-Type PC)

A bisphenol A-type polycarbonate, "NOVAREX" M7027BF, produced by Mitsubishi Engineering-Plastics Corporation was foam-molded in the same manner as in <Foam-Molding of Resin Composition> of Example 1.

In the obtained molded body, particularly at the end part on the downstream side of the molten resin inflow, resin chipping or surface roughening presumed to be attributable to gas escape was observed almost throughout the molded article, and thus, the molded body could not withstand practical use.

The results are shown in Table 1.

Comparative Example 4

Production of Resin Composition

A resin composition was produced in the same manner as in <Production of Resin Composition> of Example 1 except that in <Production of Resin Composition> of Example 1, the resin composition kneaded was prepared to contain 2.1 kg of Polycarbonate (PC-1) of Production Example 1 and 0.9 kg of bisphenol A-type polycarbonate, "NOVAREX" 7022IR, produced by Mitsubishi Engineering-Plastics Corporation and "Joncryl" UVA3070PET produced by BASF (a masterbatch prepared at a ratio of resin additive ADR-4370S produced by BASF:PET=3:7) was not added.

Evaluation of Strain-Hardening Factor of Resin Composition

The extensional viscosity of the obtained resin composition was measured to evaluate the strain-hardening factor by the same method as in <Evaluation of Strain-Hardening Factor of Resin Composition> of Example 1, as a result, the strain-hardening property was not observed and therefore, the strain-hardening factor could not be evaluated.

Foam-Molding of Resin Composition

The obtained resin composition pellet was foam-molded in the same manner as in <Foam-Molding of Resin Composition> of Example 1.

The results are shown in Table 1.

SEM Observation of Foam-Molded Body

The obtained foam-molded body was observed by SEM in the same manner as in <SEM Observation of Foam-Molded Body> of Example 1, and the average bubble diameter was calculated.

The results are shown in Table 1.

Comparative Example 5

Evaluation of Strain-Hardening Factor of Polycarbonate (PC-3)

The extensional viscosity of Polycarbonate (PC-3) of Production Example 3 was measured to evaluate the strain-hardening factor by the same method as in <Evaluation of Strain-Hardening Factor of Resin Composition> of Example 1, as a result, the strain-hardening property was not observed and therefore, the strain-hardening factor could not be evaluated.

The result is shown in Table 1.

Foam-Molding of Polycarbonate (PC-3)

Polycarbonate (PC-3) of Production Example 3 was foam-molded in the same manner as in <Foam-Molding of Resin Composition> of Example 1.

The results are shown in Table 1.

SEM Observation of Foam-Molded Body

The obtained foam-molded body was observed by SEM in the same manner as in <SEM Observation of Foam-Molded Body> of Example 1, and the average bubble diameter was calculated.

The results are shown in Table 1.

TABLE 1

| | Resin Composition | | Physical Properties | Foam-Molding Conditions | | | | Molded Body | | | |
| --- | --- | --- | --- | --- | --- | --- | --- | --- | --- | --- | --- |
| | Blending Ratio (mass basis) | Amount of Branching Agent Added parts by mass | Amount of Resin Strain-Hardening Factor | Temperature °C. | Physical Foaming Agent | Amount of Foaming Agent Injected parts by mass | Thickness of Mold mm | Mold Opening Amount mm | Availability of Foam-Molding | Thickness of Molded Article mm | Expansion Ratio | Foamed Cell Diameter µm |
| Example 1 | PC-1:5010R5L = 7:3 | 0.3 | 1.4 | 250 | nitrogen | 0.8 | 1.5 | 1.5 | A | 3.0 | 2 | 23.1 |
| Example 2 | PC-1:5010R5L = 7:3 | 1.0 | 1.5 | 250 | nitrogen | 0.8 | 1.5 | 1.5 | A | 3.0 | 2 | 24.9 |
| Example 3 | PC-1:7022IR = 1:1 | 1.0 | 0.1 | 250 | nitrogen | 0.8 | 1.5 | 1.5 | A | 3.0 | 2 | 80.3 |
| Example 4 | PC-1:7022IR = 7:3 | 1.0 | 0.2 | 250 | nitrogen | 0.8 | 1.5 | 1.5 | A | 3.0 | 2 | 79.9 |
| Example 5 | PC-2 | 0.2 (added at polymerization) | 0.4 | 250 | nitrogen | 0.8 | 1.5 | 1.5 | A | 3.0 | 2 | 20.6 |
| Comparative Example 1 | 7022IR | — | Incapable of evaluation | 300 | nitrogen | 0.8 | 1.5 | 1.5 | C | — | — | — |
| Comparative Example 2 | 5010R5L | — | incapable of evaluation | 250 | carbon dioxide | 1.7 | 1.5 | 1.5 | B | 2.8-4.6 | — | 50.0 |

TABLE 1-continued

| | Resin Composition | | Physical Properties | Foam-Molding Conditions | | | | | Molded Body | | | |
|---|---|---|---|---|---|---|---|---|---|---|---|---|
| | Blending Ratio (mass basis) | Amount of Branching Agent Added parts by mass | Resin Strain-Hardening Factor | Temperature ° C. | Physical Foaming Agent | Amount of Foaming Agent Injected parts by mass | Thickness of Mold mm | Mold Opening Amount mm | Availability of Foam-Molding | Thickness of Molded Article mm | Expansion Ratio | Foamed Cell Diameter μm |
| Comparative Example 3 | M7027BF | — | 0.3 | 350 | nitrogen | 0.8 | 1.5 | 1.5 | C | — | — | — |
| Comparative Example 4 | PC-1:7022IR = 7:3 | — | incapable of evaluation | 250 | nitrogen | 0.8 | 1.5 | 1.5 | A | 3.0 | 2 | 144.7 |
| Comparative Example 5 | PC-3 | — | incapable of evaluation | 250 | nitrogen | 0.8 | 1.5 | 1.5 | A | 3.0 | 2 | 151.2 |

While the invention has been described in detail and with reference to specific embodiments thereof, it will be apparent to one skilled in the art that various changes and modifications can be made therein without departing from the spirit and scope of the invention. This application is based on Japanese Patent Application (Patent Application No. 2012-034324) filed on Feb. 20, 2012, the contents of which are incorporated herein by way of reference.

INDUSTRIAL APPLICABILITY

The molded body of the present invention is not particularly limited in its utilization field and can be used as an industrial material over a wide range of fields. The molded body of the present invention is lightweight and excellent in the impact resistance and therefore, can be suitably used particularly for a structural member, a packaging material, a container, a buffer material, an electric/electronic material, an automobile member and the like.

The invention claimed is:

1. A foam-molded body, comprising a resin composition comprising a polycarbonate resin having at least a structural unit derived from a dihydroxy compound represented by formula (1):

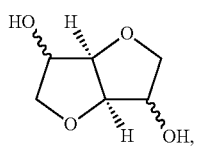

(1)

wherein, in the structural unit derived from the dihydroxy compound represented by formula (1), the hydroxyl oxygens of formula (1) are present as oxygens contained in carbonate groups of the polycarbonate resin,
and wherein:
an average diameter of bubbles in said foam-molded body is 100 μm or less;
a strain-hardening factor of uniaxial extensional viscosity of said resin composition is from 0.1 to 5;
the polycarbonate resin further comprises a structural unit derived from a compound comprising three or more hydroxy groups, said compound comprising three or more hydroxyl groups being contained in a ratio of 0.2 to 2 mol % based on structural units derived from all dihydroxy-containing compounds contained in the polycarbonate resin; or
the resin composition further comprises a compound having two or more functional groups selected from the group consisting of a carbodiimide, an isocyanate, an epoxy, a silane, an acid anhydride, an oxazoline, and a mixture thereof.

2. The foam-molded body of claim 1, wherein the polycarbonate resin is a copolymer of the structural unit derived from the dihydroxy compound of formula (1) and a structural unit derived from another dihydroxy compound.

3. The foam-molded body of claim 2, wherein the structural unit derived from another dihydroxy compound is any one structural unit selected from the group consisting of

 (2),

 (3),

 (4), and

 (5), wherein:
R$^1$ represents a substituted or unsubstituted cycloalkylene group having a carbon number of 4 to 20;
R$^2$ represents a substituted or unsubstituted cycloalkylene group having a carbon number of 4 to 20;
R$^3$ represents a substituted or unsubstituted alkylene group having a carbon number of 2 to 10;
p represents an integer of 2 to 100; and
R$^4$ represents a substituted or unsubstituted alkylene group having a carbon number of 2 to 20 or a group having a substituted or unsubstituted acetal ring.

4. The foam-molded body of claim 2, wherein the structural unit derived from another dihydroxy compound is a structural unit derived from any one member selected from the group consisting of a cyclohexanedimethanol compound, a tricyclodecanedimethanol compound and a hexanediol compound.

5. The foam-molded body of claim 1, wherein said resin composition further comprises a thermoplastic resin.

6. A polycarbonate resin composition, comprising a polycarbonate resin having at least a structural unit derived from a dihydroxy compound represented by formula (1):

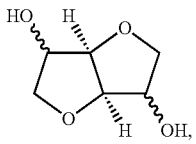 (1)

wherein, in the structural unit derived from the dihydroxy compound represented by formula (1), the hydroxyl oxygens of formula (1) are present as oxygens contained in carbonate groups of the polycarbonate resin, and wherein a strain-hardening factor of uniaxial extensional viscosity of the resin composition is from 0.1 to 5.

7. The polycarbonate resin composition of claim 6, wherein said polycarbonate resin is a copolymer of the structural unit derived from the dihydroxy compound represented by formula (1) and a structural unit derived from another dihydroxy compound.

8. The polycarbonate resin composition of claim 7, wherein the structural unit derived from another dihydroxy compound is any one structural unit selected from the group consisting of

HO—$R^1$—OH (2),

HO—$CH_2$—$R^2$—$CH_2$—OH (3),

H—$(O—R^3)_p$—OH (4), and

HO—$R^4$—OH (5), wherein:
$R^1$ represents a substituted or unsubstituted cycloalkylene group having a carbon number of 4 to 20;
$R^2$ represents a substituted or unsubstituted cycloalkylene group having a carbon number of 4 to 20;
$R^3$ represents a substituted or unsubstituted alkylene group having a carbon number of 2 to 10;
p represents an integer of 2 to 100; and
$R^4$ represents a substituted or unsubstituted alkylene group having a carbon number of 2 to 20 or a group having a substituted or unsubstituted acetal ring.

9. The polycarbonate resin composition of claim 7, wherein the structural unit derived from another dihydroxy compound is a structural unit derived from any one member selected from the group consisting of a cyclohexanedimethanol compound, a tricyclodecanedimethanol compound and a hexanediol compound.

10. The polycarbonate resin composition of claim 6, further comprising a thermoplastic resin.

11. A molded body formed from the polycarbonate resin composition of claim 6.

* * * * *